(12) United States Patent
Wang et al.

(10) Patent No.: US 11,650,429 B2
(45) Date of Patent: May 16, 2023

(54) THIN LIQUID CRYSTAL STACK FOR POLARIZATION CONVERSION

(71) Applicant: Meta Platforms Technologies, LLC, Menlo Park, CA (US)

(72) Inventors: Junren Wang, Kirkland, WA (US); Mengfei Wang, Woodinville, WA (US); Yun-Han Lee, Redmond, WA (US); Yuge Huang, Oviedo, FL (US); Lu Lu, Kirkland, WA (US); Barry David Silverstein, Kirkland, WA (US)

(73) Assignee: META PLATFORMS TECHNOLOGIES, LLC, Menlo Park, CA (US)

( * ) Notice: Subject to any disclaimer, the term of this patent is extended or adjusted under 35 U.S.C. 154(b) by 0 days.

(21) Appl. No.: 17/671,348

(22) Filed: Feb. 14, 2022

(65) Prior Publication Data
US 2022/0276499 A1 Sep. 1, 2022

Related U.S. Application Data

(60) Provisional application No. 63/153,205, filed on Feb. 24, 2021.

(51) Int. Cl.
*G02B 27/28* (2006.01)
*G02B 27/30* (2006.01)
(Continued)

(52) U.S. Cl.
CPC ......... *G02B 27/286* (2013.01); *G02B 5/1814* (2013.01); *G02B 5/1833* (2013.01);
(Continued)

(58) Field of Classification Search
CPC .............. G02B 27/286; G02B 27/0172; G02B 27/30; G02B 5/1814; G02B 5/1833;
(Continued)

(56) References Cited

U.S. PATENT DOCUMENTS

2018/0275350 A1\* 9/2018 Oh ........................... G02B 6/10
2019/0285891 A1 9/2019 Lam et al.
2021/0011300 A1 1/2021 Leister et al.

FOREIGN PATENT DOCUMENTS

WO WO2021137967 A1 7/2021

OTHER PUBLICATIONS

International Search Report and Written Opinion for International Application No. PCT/US2022/017639, dated May 17, 2022, 12 pages.

\* cited by examiner

*Primary Examiner* — Anne M Hines
(74) *Attorney, Agent, or Firm* — Weaver Austin Villeneuve & Sampson LLP

(57) ABSTRACT

A polarization conversion device includes a geometric phase grating and an angular selective waveplate. The geometric phase grating includes a first liquid crystal layer and is configured to diffract a unpolarized or partially polarized incident light beam into a first light beam and a second light beam (e.g., in two different diffraction orders). The first light beam is characterized by a first polarization state and propagates in a first direction. The second light beam is characterized by a second polarization state and propagates in a second direction. The angular selective waveplate includes a second liquid crystal layer, and functions as a zero or full-wave plate for the first light beam incident in the first direction and a half-wave plate for the second light beam incident in the second direction.

20 Claims, 25 Drawing Sheets

(51) Int. Cl.
*G02B 27/01* (2006.01)
*G02B 5/18* (2006.01)
*G02B 5/30* (2006.01)

(52) U.S. Cl.
CPC ....... *G02B 5/3016* (2013.01); *G02B 27/0172* (2013.01); *G02B 27/30* (2013.01); *G02B 2027/0123* (2013.01); *G02B 2027/0138* (2013.01); *G02B 2027/0178* (2013.01); *G02B 2027/0187* (2013.01)

(58) Field of Classification Search
CPC .......... G02B 5/3016; G02B 2027/0123; G02B 2027/0138; G02B 2027/0178; G02B 2027/0187
See application file for complete search history.

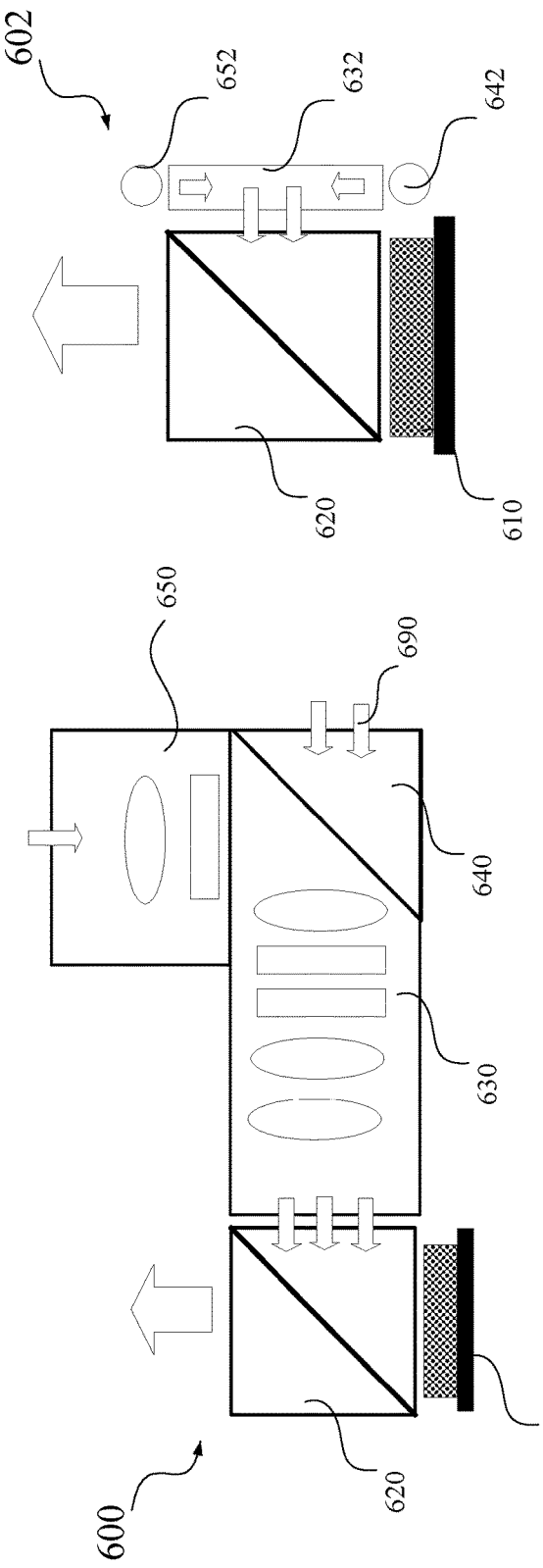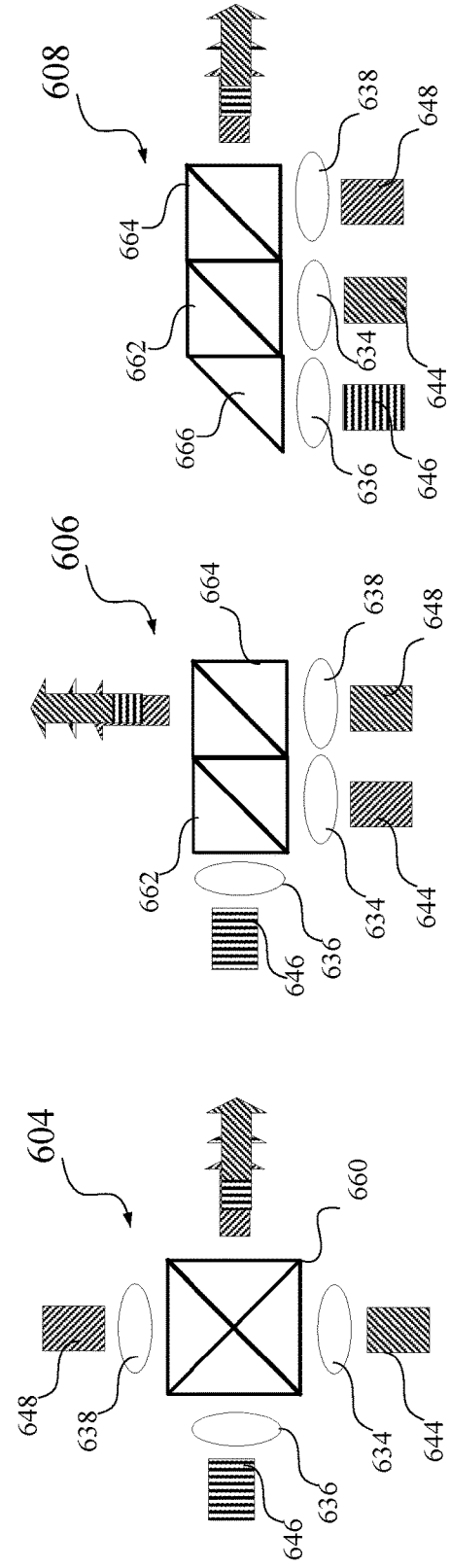

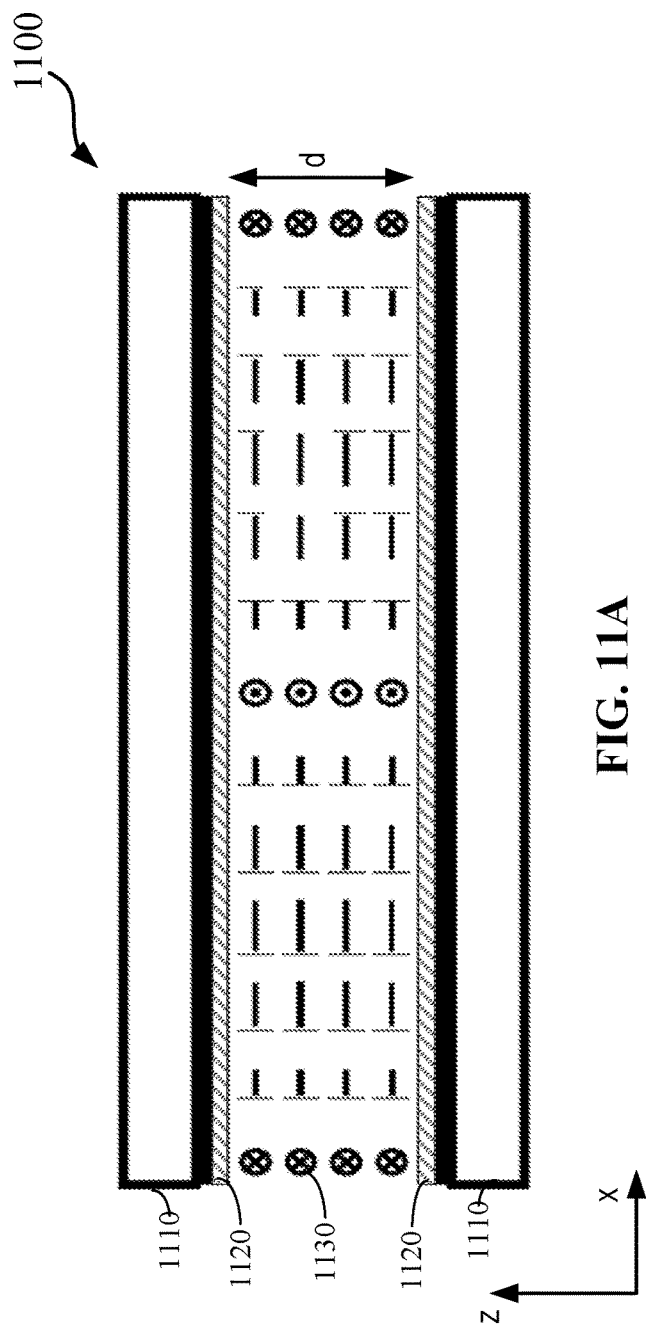
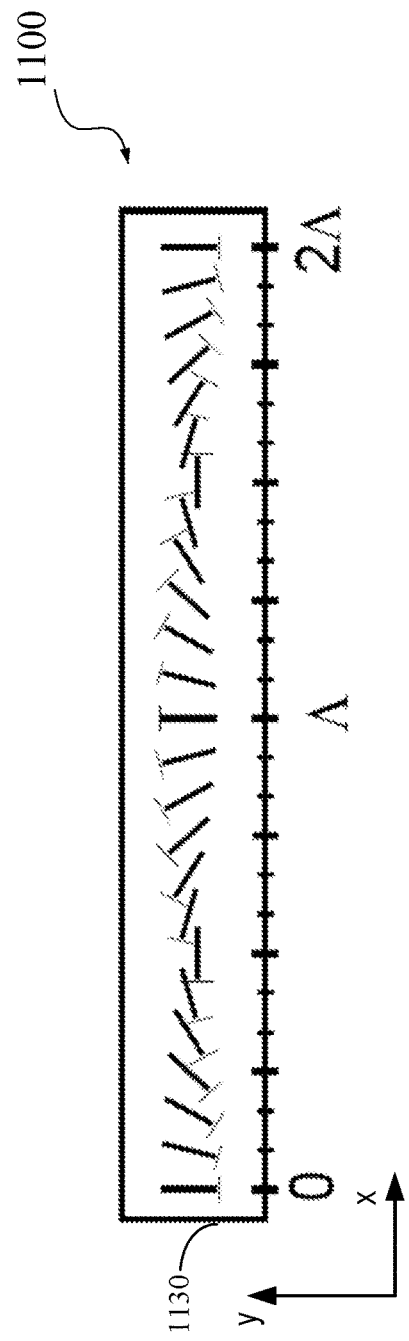
FIG. 11A
FIG. 11B

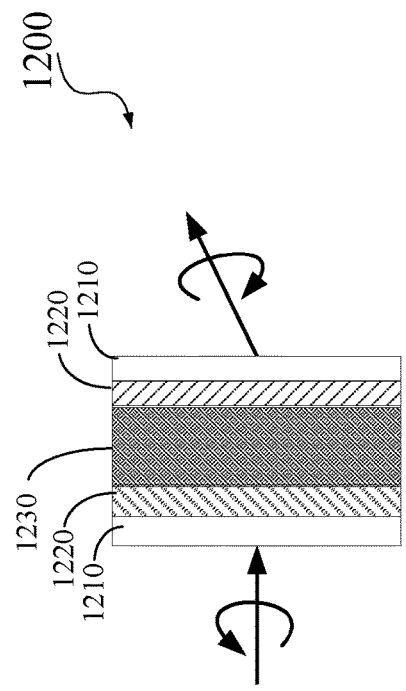
FIG. 12A
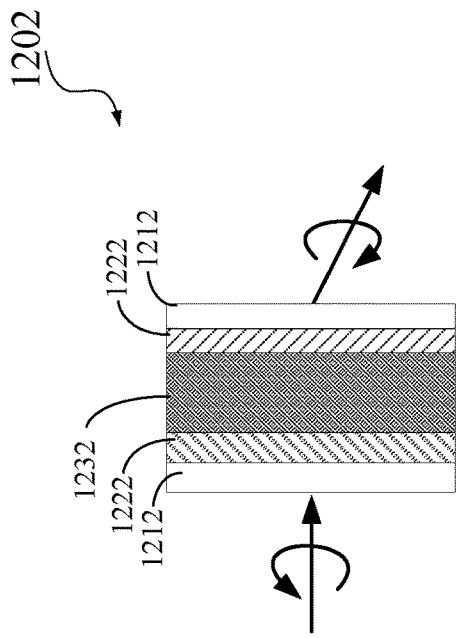
FIG. 12B
FIG. 12C
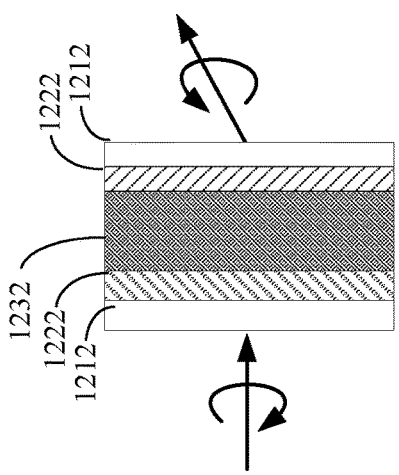
FIG. 12D
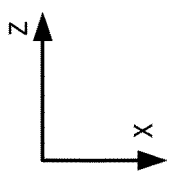

THIN LIQUID CRYSTAL STACK FOR POLARIZATION CONVERSION

CROSS-REFERENCE TO RELATED APPLICATIONS

This application claims the benefit of and priority to U.S. Provisional Application No. 63/153,205, filed Feb. 24, 2021, entitled "THIN LIQUID CRYSTAL STACK FOR POLARIZATION CONVERSION," which is herein incorporated by reference in its entirety for all purposes.

BACKGROUND

An artificial reality system, such as a head-mounted display (HMD) or heads-up display (HUD) system, generally includes a near-eye display (e.g., in the form of a headset or a pair of glasses) configured to present content to a user via an electronic or optic display in front of the user's eyes (e.g., about 10-20 mm away from the user's eyes). The near-eye display may present virtual objects or combine images of real objects with virtual objects, as in virtual reality (VR), augmented reality (AR), or mixed reality (MR) applications. For example, in an AR system, a user may view both images of virtual objects (e.g., computer-generated images) and the surrounding environment by, for example, seeing through transparent display glasses or lenses (often referred to as optical see-through) or viewing displayed images of the surrounding environment captured by a camera (often referred to as video see-through).

A near-eye display generally includes an optical system configured to form an image of a computer-generated image on an image plane. The optical system of the near-eye display may relay the image generated by an image source (e.g., a display panel) to create a virtual image that appears to be away from the image source and further than just a few centimeters away from the user's eyes. For example, the optical system may collimate the light from the image source or otherwise convert spatial information of the displayed virtual objects into angular information to create a virtual image that may appear to be far away. The optical system may also magnify the image source to make the image appear larger than the actual size of the image source. It is generally desirable that the optical system of a near-eye display has a small size, a low weight, a large field of view, a large eye box, a high efficiency, and a low cost.

SUMMARY

This disclosure relates generally to polarization conversion and polarized light generation. More specifically, disclosed herein are techniques for converting the polarization state of an incident light beam or otherwise generating a light beam with a desired polarization state using a stack of thin liquid crystal layers. The stack of thin liquid crystal layers may have a low thickness (and thus a low weight) and a low loss (and thus a high efficiency) compared with existing polarization conversion and polarized light generation techniques. Polarization converters or polarization beam generators disclosed herein can be used in various optical systems (e.g., near-eye displays) that may utilize polarized light to achieve desired functions. Various inventive embodiments are described herein, including devices, systems, methods, materials, processes, and the like.

According to certain embodiments, a device may include a geometric phase grating and an angular selective waveplate. The geometric phase grating may include a first liquid crystal layer and may diffract an incident light beam into a first light beam and a second light beam. The first light beam may be characterized by a first polarization state and may propagate in a first direction, and the second light beam may be characterized by a second polarization state and may propagate in a second direction. The angular selective waveplate may include a second liquid crystal layer. The angular selective waveplate may be a zero or full-wave plate for the first light beam incident in the first direction, and a half-wave plate for the second light beam incident in the second direction.

In some embodiments of the device, the geometric phase grating may include a Pancharatnam-Berry phase (PBP) grating. In some embodiments, a thickness and a material of the PBP grating may be selected such that a birefringence of the PBP grating is about a half wavelength. In some embodiments, the first polarization state is a right-handed circular polarization, and the second polarization state is a left-handed circular polarization. In some embodiments, the first polarization state is a left-handed circular polarization, and the second polarization state is a right-handed circular polarization. In some embodiments, the angular selective waveplate may include a homogeneous oblique plate including liquid crystal molecules tilted uniformly at an oblique angle, or a splayed plate including liquid crystal molecules aligned at different respective angles in different layers.

In some embodiments, the device may include a polarizer after the angular selective waveplate and configured to transmit light in the first polarization state and block light in the second polarization state. In some embodiments, the device may include a second geometric phase grating after the angular selective waveplate, the second geometric phase grating configured to change polarization states of the first light beam and the second light beam that pass through the angular selective waveplate. The second geometric phase grating may include a geometric phase lens configured to collimate the first light beam and the second light beam that pass through the angular selective waveplate. In some embodiments, the device may include a polarizer after the second geometric phase grating, the polarizer configured to transmit light in the second polarization state and block light in the first polarization state.

In some embodiments, the device may include a depolarizer configured to depolarize the incident light beam before the incident light beam reaches the geometric phase grating. In some embodiments, the device may include a collimator configured to collimate the first light beam and the second light beam that pass through the angular selective waveplate, wherein the collimator comprises at least one of a refractive lens, a Fresnel lens, or a geometric phase lens. In some embodiments, the device may include a waveplate configured to covert circularly polarized light to linearly polarized light.

According to certain embodiments, a polarization converter may include a first geometric phase grating and an angular selective waveplate. The first geometric phase grating may be configured to diffract an incident light beam into a first light beam and a second light beam. The first light beam may be characterized by a first circular polarization state and a first propagation direction, and the second light beam may be characterized by a second circular polarization state and a second propagation direction. The angular selective waveplate may be configured to receive the first light beam and the second light beam from the first geometric phase grating, maintain the first circular polarization state of the first light beam incident in the first direction, and change a polarization state of the second light beam incident in the second direction from the second circular polarization state to the first circular polarization state.

In some embodiments of the polarization converter, the first geometric phase grating may include a Pancharatnam-Berry phase (PBP) grating. In some embodiments, the angular selective waveplate may include a homogeneous oblique plate including liquid crystal molecules tilted uniformly at an oblique angle, or a splayed plate including liquid crystal molecules aligned at different respective angles in different layers. In some embodiments, the polarization converter may include a circular polarizer configured to transmit light in the first circular polarization state and block light in the second circular polarization state. In some embodiments, the polarization converter may include a second geometric phase grating configured to change polarization states of the first light beam and the second light beam that pass through the angular selective waveplate. The second geometric phase grating may include a geometric phase lens configured to collimate the first light beam and the second light beam that pass through the angular selective waveplate. In some embodiments, the polarization converter may include a circular polarizer configured to transmit light in the second circular polarization state and block light in the first circular polarization state, a quarter-wave plate configured to covert circularly polarized light into linearly polarized light, or both. In some embodiments, the polarization converter may include a collimator configured to collimate the first light beam and the second light beam that pass through the angular selective waveplate, the collimator including at least one of a refractive lens, a Fresnel lens, or a geometric phase lens. In some embodiments, the polarization converter may include a depolarizer configured to depolarize the incident light beam before the incident light beam reaches the first geometric phase grating.

This summary is neither intended to identify key or essential features of the claimed subject matter, nor is it intended to be used in isolation to determine the scope of the claimed subject matter. The subject matter should be understood by reference to appropriate portions of the entire specification of this disclosure, any or all drawings, and each claim. The foregoing, together with other features and examples, will be described in more detail below in the following specification, claims, and accompanying drawings.

BRIEF DESCRIPTION OF THE DRAWINGS

Illustrative embodiments are described in detail below with reference to the following figures.

FIG. 6A illustrates an example of a LCoS projection display system according to certain embodiments.

FIG. 6B illustrates another example of a LCoS projection display system according to certain embodiments.

FIG. 6C illustrates an example of a beam combiner for LCoS projection display systems according to certain embodiments.

FIG. 6D illustrates another example of a beam combiner for LCoS projection display systems according to certain embodiments.

FIG. 6E illustrates yet another example of a beam combiner for LCoS projection display systems according to certain embodiments.

FIG. 11A is view of an x-z plane of an example of a PBP grating according to certain embodiments. FIG. 11B is a view of an x-y plane of the example of the PBP grating shown in FIG. 11A according to certain embodiments.

FIGS. 12A and 12B illustrate operations of an example of a PBP grating according to certain embodiments. FIG. 12A illustrates an example of diffracting a right-handed circularly polarized incident light beam by the PBP grating. FIG. 12B illustrates an example of diffracting a left-handed circularly polarized incident light beam by the PBP grating.

FIGS. 12C and 12D illustrate operations of another example of a PBP grating according to certain embodiments. FIG. 12C illustrates an example of diffracting a right-handed circularly polarized incident light beam by the PBP grating. FIG. 12D illustrates an example of diffracting a left-handed circularly polarized incident light beam by the PBP grating.

Figure 1:
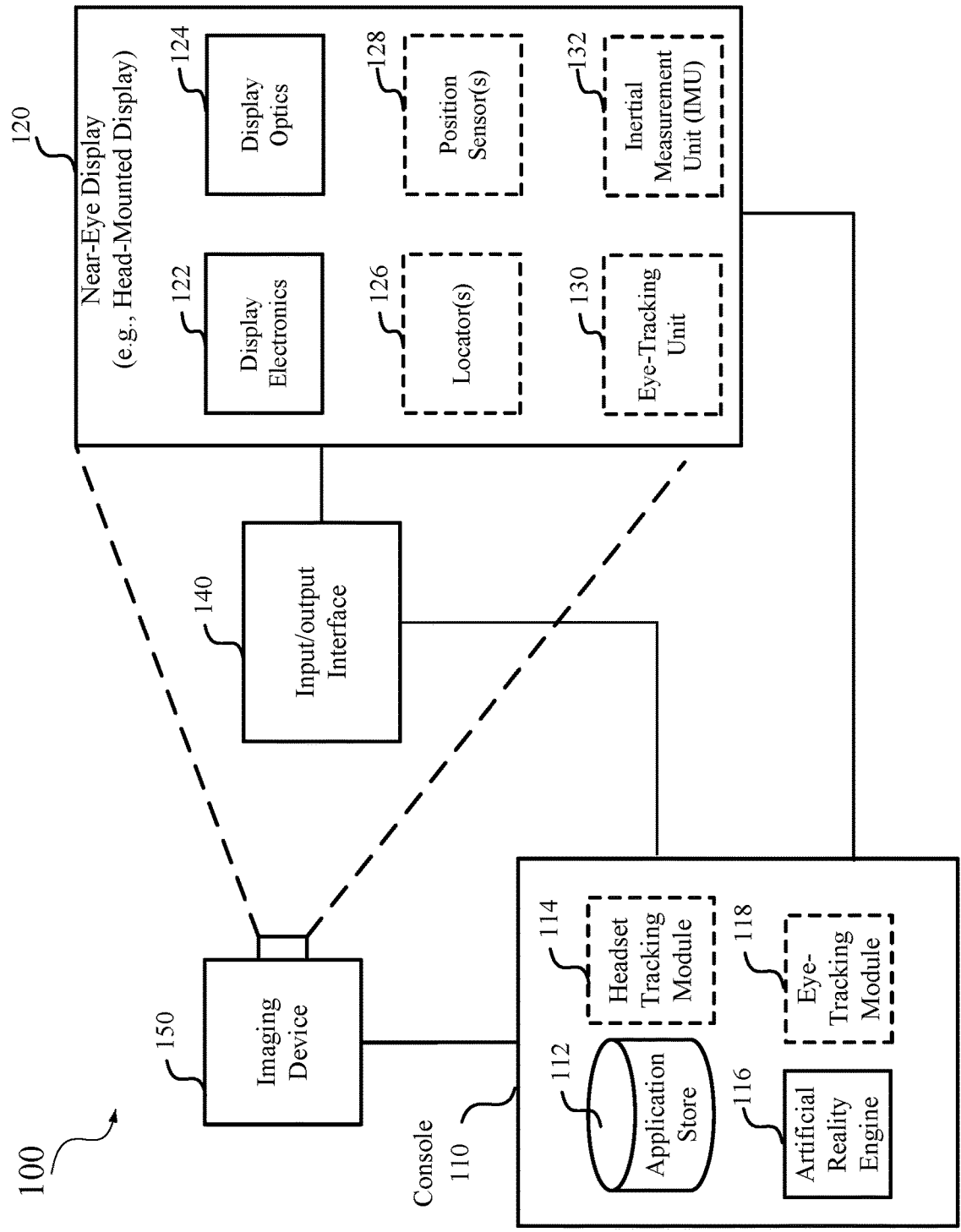
FIG. 1 is a simplified block diagram of an example of an artificial reality system environment including a near-eye display according to certain embodiments.

The figures depict embodiments of the present disclosure for purposes of illustration only. One skilled in the art will readily recognize from the following description that alternative embodiments of the structures and methods illustrated may be employed without departing from the principles, or benefits touted, of this disclosure.

In the appended figures, similar components and/or features may have the same reference label. Further, various components of the same type may be distinguished by following the reference label by a dash and a second label that distinguishes among the similar components. If only the first reference label is used in the specification, the description is applicable to any one of the similar components having the same first reference label irrespective of the second reference label.

DETAILED DESCRIPTION

Techniques disclosed herein relate generally to polarization conversion and polarized light generation. More specifically, disclosed herein are techniques for converting the polarization state of an incident light beam or generating a light beam with a certain polarization state using a stack of thin liquid crystal layers. The stack of thin liquid crystal layers may have a low thickness (and thus a low weight) and a low polarization conversion loss (and thus a high efficiency) compared with existing techniques. Polarization converters or polarization beam generators disclosed herein can be used in various optical systems that may utilize polarized light to achieve desired functions. For example, the polarization converters may be used as part of display optics in near-eye displays to reduce the sizes and dimensions of the near-eye displays. Various inventive embodiments are described herein, including devices, systems, methods, materials, and the like.

In many optical systems, linearly or circularly polarized light beams may be used to achieve various functions, such as beam splitting, combining, multiplexing, or other polarization-dependent (or polarization directed) light processing. For example, in some optical systems, light beams of a certain polarization state may be reflected or deflected by a polarization-dependent device to change (e.g., bend or fold) the optical paths of the light beams and/or may be converted to light beams in a different polarization state to pass through the polarization-dependent device. In another example, polarized light may be used in liquid crystal-on-silicon (LCoS) projection display systems, where the intensity of the light displayed to a user may be controlled by modulating the polarization state (e.g., polarization direction) of the illumination light. The linearly or circularly polarized light beams may be generated or converted from an unpolarized or partially polarized light beam emitted by a light source, such as a laser or a light emitting device (LED). The polarized light beams may be generated using polarization converters or polarization generators, such as waveplates (e.g., quarter-wave plates or half-wave plates), polarizing plate beam splitters (e.g., cube beam splitters), and absorbance polarizers that may absorb light in a certain polarization state while allowing light in a different (e.g., orthogonal) polarization state to pass through such that the transmitted beam may have a desired polarization state. These polarization converters and polarization generators are generally bulky and/or may have a high loss and thus a low conversion efficiency.

According to certain embodiments, a polarization converter or polarization beam generator may include a polarization-dependent grating and an angular selective waveplate arranged in a stack. The polarization-dependent grating may diffract incident light in different polarization states to different directions. For example, the polarization-dependent grating may include a geometric phase grating, such as a Pancharatnam-Berry phase (PBP) grating, that may diffract an unpolarized incident beam into a first light beam that is right-handed circularly polarized and propagates in a first direction, and a second light beam that is left-handed circularly polarized and propagates in a second direction. The angular selective waveplate may maintain or change the polarization state of an incident light beam, depending on the incident angle and the polarization state of the incident light beam. For example, the angular selective waveplate may maintain the polarization state of the right-handed circularly polarized light beam propagating in the first direction, while changing the polarization state of the left-handed circularly polarized light beam propagating in the second direction to right-handed circular polarization. As such, the light beams after passing through the angular selective waveplate may have the same polarization state (e.g., right-handed circular polarization). The light beams may optionally be filtered by a polarizer to remove components in other polarization states (if any). In some embodiments, the light beams may be collimated (or focused) by a geometric phase lens, such as a PBP lens, which may also change the polarization states of the beams, such as from right-handed circular polarization to left-handed circular polarization.

Polarization converters and polarization beam generators disclosed herein may have a low thickness and thus a low weight, compared to existing polarization converters and polarization beam generators. For example, each of the polarization-dependent grating and the angular selective waveplate may have a respective liquid crystal layer with a thickness less than a few microns or a few tens of microns (e.g., less than about 100, 50, 20, or 10 μm). Thus, the stack may have a thickness of a few tens of microns. Moreover, compared with other polarization converters and polarization beam generators, the polarization converters and polarization beam generators disclosed herein can achieve a much lower conversion loss and thus a higher conversion efficiency.

In the following description, for the purposes of explanation, specific details are set forth in order to provide a thorough understanding of examples of the disclosure. However, it will be apparent that various examples may be practiced without these specific details. For example, devices, systems, structures, assemblies, methods, and other components may be shown as components in block diagram form in order not to obscure the examples in unnecessary detail. In other instances, well-known devices, processes, systems, structures, and techniques may be shown without necessary detail in order to avoid obscuring the examples. The figures and description are not intended to be restrictive. The terms and expressions that have been employed in this disclosure are used as terms of description and not of limitation, and there is no intention in the use of such terms and expressions of excluding any equivalents of the features shown and described or portions thereof. The word "example" is used herein to mean "serving as an example, instance, or illustration." Any embodiment or design described herein as "example" is not necessarily to be construed as preferred or advantageous over other embodiments or designs.

FIG. 1 is a simplified block diagram of an example of an artificial reality system environment 100 including a near-eye display 120 in accordance with certain embodiments. Artificial reality system environment 100 shown in FIG. 1 may include near-eye display 120, an optional external imaging device 150, and an optional input/output interface 140, each of which may be coupled to an optional console 110. While FIG. 1 shows an example of artificial reality system environment 100 including one near-eye display 120, one external imaging device 150, and one input/output interface 140, any number of these components may be included in artificial reality system environment 100, or any of the components may be omitted. For example, there may be multiple near-eye displays 120 monitored by one or more external imaging devices 150 in communication with console 110. In some configurations, artificial reality system environment 100 may not include external imaging device 150, optional input/output interface 140, and optional console 110. In alternative configurations, different or additional components may be included in artificial reality system environment 100.

Near-eye display 120 may be a head-mounted display that presents content to a user. Examples of content presented by near-eye display 120 include one or more of images, videos, audio, or any combination thereof. In some embodiments, audio may be presented via an external device (e.g., speakers and/or headphones) that receives audio information from near-eye display 120, console 110, or both, and presents audio data based on the audio information. Near-eye display 120 may include one or more rigid bodies, which may be rigidly or non-rigidly coupled to each other. A rigid coupling between rigid bodies may cause the coupled rigid bodies to act as a single rigid entity. A non-rigid coupling between rigid bodies may allow the rigid bodies to move relative to each other. In various embodiments, near-eye display 120 may be implemented in any suitable form-factor, including a pair of glasses. Some embodiments of near-eye display 120 are further described below with respect to FIGS. 2 and 3. Additionally, in various embodiments, the functionality described herein may be used in a headset that combines images of an environment external to near-eye display 120 and artificial reality content (e.g., computer-generated images). Therefore, near-eye display 120 may augment images of a physical, real-world environment external to near-eye display 120 with generated content (e.g., images, video, sound, etc.) to present an augmented reality to a user.

In various embodiments, near-eye display 120 may include one or more of display electronics 122, display optics 124, and an eye-tracking unit 130. In some embodiments, near-eye display 120 may also include one or more locators 126, one or more position sensors 128, and an inertial measurement unit (IMU) 132. Near-eye display 120 may omit any of eye-tracking unit 130, locators 126, position sensors 128, and IMU 132, or include additional elements in various embodiments. Additionally, in some embodiments, near-eye display 120 may include elements combining the function of various elements described in conjunction with FIG. 1.

Display electronics 122 may display or facilitate the display of images to the user according to data received from, for example, console 110. In various embodiments, display electronics 122 may include one or more display panels, such as a liquid crystal display (LCD), an organic light emitting diode (OLED) display, an inorganic light emitting diode (ILED) display, a micro light emitting diode (µLED) display, an active-matrix OLED display (AMO-LED), a transparent OLED display (TOLED), or some other display. For example, in one implementation of near-eye display 120, display electronics 122 may include a front TOLED panel, a rear display panel, and an optical component (e.g., an attenuator, polarizer, or diffractive or spectral film) between the front and rear display panels. Display electronics 122 may include pixels to emit light of a predominant color such as red, green, blue, white, or yellow. In some implementations, display electronics 122 may display a three-dimensional (3D) image through stereoscopic effects produced by two-dimensional panels to create a subjective perception of image depth. For example, display electronics 122 may include a left display and a right display positioned in front of a user's left eye and right eye, respectively. The left and right displays may present copies of an image shifted horizontally relative to each other to create a stereoscopic effect (i.e., a perception of image depth by a user viewing the image).

In certain embodiments, display optics 124 may display image content optically (e.g., using optical waveguides and couplers) or magnify image light received from display electronics 122, correct optical errors associated with the image light, and present the corrected image light to a user of near-eye display 120. In various embodiments, display optics 124 may include one or more optical elements, such as, for example, a substrate, optical waveguides, an aperture, a Fresnel lens, a convex lens, a concave lens, a filter, input/output couplers, or any other suitable optical elements that may affect image light emitted from display electronics 122. Display optics 124 may include a combination of different optical elements as well as mechanical couplings to maintain relative spacing and orientation of the optical elements in the combination. One or more optical elements in display optics 124 may have an optical coating, such as an anti-reflective coating, a reflective coating, a filtering coating, or a combination of different optical coatings.

Magnification of the image light by display optics 124 may allow display electronics 122 to be physically smaller, weigh less, and consume less power than larger displays. Additionally, magnification may increase a field of view of the displayed content. The amount of magnification of image light by display optics 124 may be changed by adjusting, adding, or removing optical elements from display optics 124. In some embodiments, display optics 124 may project displayed images to one or more image planes that may be further away from the user's eyes than near-eye display 120.

Display optics 124 may also be designed to correct one or more types of optical errors, such as two-dimensional optical errors, three-dimensional optical errors, or any combination thereof. Two-dimensional errors may include optical aberrations that occur in two dimensions. Example types of two-dimensional errors may include barrel distortion, pincushion distortion, longitudinal chromatic aberration, and transverse chromatic aberration. Three-dimensional errors may include optical errors that occur in three dimensions. Example types of three-dimensional errors may include spherical aberration, comatic aberration, field curvature, and astigmatism.

Locators 126 may be objects located in specific positions on near-eye display 120 relative to one another and relative to a reference point on near-eye display 120. In some implementations, console 110 may identify locators 126 in images captured by external imaging device 150 to determine the artificial reality headset's position, orientation, or both. A locator 126 may be a light emitting diode (LED), a corner cube reflector, a reflective marker, a type of light source that contrasts with an environment in which near-eye display 120 operates, or any combination thereof. In embodiments where locators 126 are active components (e.g., LEDs or other types of light emitting devices), locators 126 may emit light in the visible band (e.g., about 380 nm to 750 nm), in the infrared (IR) band (e.g., about 750 nm to 1 mm), in the ultraviolet band (e.g., about 10 nm to about 380 nm), in another portion of the electromagnetic spectrum, or in any combination of portions of the electromagnetic spectrum.

External imaging device 150 may include one or more cameras, one or more video cameras, any other device capable of capturing images including one or more of locators 126, or any combination thereof. Additionally, external imaging device 150 may include one or more filters (e.g., to increase signal to noise ratio). External imaging device 150 may be configured to detect light emitted or reflected from locators 126 in a field of view of external imaging device 150. In embodiments where locators 126 include passive elements (e.g., retroreflectors), external imaging device 150 may include a light source that illuminates some or all of locators 126, which may retro-reflect the light to the light source in external imaging device 150. Slow calibration data may be communicated from external imaging device 150 to console 110, and external imaging device 150 may receive one or more calibration parameters from console 110 to adjust one or more imaging parameters (e.g., focal length, focus, frame rate, sensor temperature, shutter speed, aperture, etc.).

Position sensors 128 may generate one or more measurement signals in response to motion of near-eye display 120. Examples of position sensors 128 may include accelerometers, gyroscopes, magnetometers, other motion-detecting or error-correcting sensors, or any combination thereof. For example, in some embodiments, position sensors 128 may include multiple accelerometers to measure translational motion (e.g., forward/back, up/down, or left/right) and multiple gyroscopes to measure rotational motion (e.g., pitch, yaw, or roll). In some embodiments, various position sensors may be oriented orthogonally to each other.

IMU 132 may be an electronic device that generates fast calibration data based on measurement signals received from one or more of position sensors 128. Position sensors 128 may be located external to IMU 132, internal to IMU 132, or any combination thereof. Based on the one or more measurement signals from one or more position sensors 128, IMU 132 may generate fast calibration data indicating an estimated position of near-eye display 120 relative to an initial position of near-eye display 120. For example, IMU 132 may integrate measurement signals received from accelerometers over time to estimate a velocity vector and integrate the velocity vector over time to determine an estimated position of a reference point on near-eye display 120. Alternatively, IMU 132 may provide the sampled measurement signals to console 110, which may determine the fast calibration data. While the reference point may generally be defined as a point in space, in various embodiments, the reference point may also be defined as a point within near-eye display 120 (e.g., a center of IMU 132).

Eye-tracking unit 130 may include one or more eye-tracking systems. Eye tracking may refer to determining an eye's position, including orientation and location of the eye, relative to near-eye display 120. An eye-tracking system may include an imaging system to image one or more eyes and may optionally include a light emitter, which may generate light that is directed to an eye such that light reflected by the eye may be captured by the imaging system. For example, eye-tracking unit 130 may include a non-coherent or coherent light source (e.g., a laser diode) emitting light in the visible spectrum or infrared spectrum, and a camera capturing the light reflected by the user's eye. As another example, eye-tracking unit 130 may capture reflected radio waves emitted by a miniature radar unit. Eye-tracking unit 130 may use low-power light emitters that emit light at frequencies and intensities that would not injure the eye or cause physical discomfort. Eye-tracking unit 130 may be arranged to increase contrast in images of an eye captured by eye-tracking unit 130 while reducing the overall power consumed by eye-tracking unit 130 (e.g., reducing power consumed by a light emitter and an imaging system included in eye-tracking unit 130). For example, in some implementations, eye-tracking unit 130 may consume less than 100 milliwatts of power.

Near-eye display 120 may use the orientation of the eye to, e.g., determine an inter-pupillary distance (IPD) of the user, determine gaze direction, introduce depth cues (e.g., blur image outside of the user's main line of sight), collect heuristics on the user interaction in the VR media (e.g., time spent on any particular subject, object, or frame as a function of exposed stimuli), some other functions that are based in part on the orientation of at least one of the user's eyes, or any combination thereof. Because the orientation may be determined for both eyes of the user, eye-tracking unit 130 may be able to determine where the user is looking. For example, determining a direction of a user's gaze may include determining a point of convergence based on the determined orientations of the user's left and right eyes. A point of convergence may be the point where the two foveal axes of the user's eyes intersect. The direction of the user's gaze may be the direction of a line passing through the point of convergence and the mid-point between the pupils of the user's eyes.

Input/output interface 140 may be a device that allows a user to send action requests to console 110. An action request may be a request to perform a particular action. For example, an action request may be to start or to end an application or to perform a particular action within the application. Input/output interface 140 may include one or more input devices. Example input devices may include a keyboard, a mouse, a game controller, a glove, a button, a touch screen, or any other suitable device for receiving action requests and communicating the received action requests to console 110. An action request received by the input/output interface 140 may be communicated to console 110, which may perform an action corresponding to the requested action. In some embodiments, input/output interface 140 may provide haptic feedback to the user in accordance with instructions received from console 110. For example, input/output interface 140 may provide haptic feedback when an action request is received, or when console 110 has performed a requested action and communicates instructions to input/output interface 140. In some embodiments, external imaging device 150 may be used to track input/output interface 140, such as tracking the location or position of a controller (which may include, for example, an IR light source) or a hand of the user to determine the motion of the user. In some embodiments, near-eye display 120 may include one or more imaging devices to track input/output interface 140, such as tracking the location or position of a controller or a hand of the user to determine the motion of the user.

Console 110 may provide content to near-eye display 120 for presentation to the user in accordance with information received from one or more of external imaging device 150, near-eye display 120, and input/output interface 140. In the example shown in FIG. 1, console 110 may include an application store 112, a headset tracking module 114, an artificial reality engine 116, and an eye-tracking module 118. Some embodiments of console 110 may include different or additional modules than those described in conjunction with FIG. 1. Functions further described below may be distributed among components of console 110 in a different manner than is described here.

In some embodiments, console 110 may include a processor and a non-transitory computer-readable storage medium storing instructions executable by the processor. The processor may include multiple processing units executing instructions in parallel. The non-transitory computer-readable storage medium may be any memory, such as a hard disk drive, a removable memory, or a solid-state drive (e.g., flash memory or dynamic random-access memory (DRAM)). In various embodiments, the modules of console 110 described in conjunction with FIG. 1 may be encoded as instructions in the non-transitory computer-readable storage medium that, when executed by the processor, cause the processor to perform the functions further described below.

Application store 112 may store one or more applications for execution by console 110. An application may include a group of instructions that, when executed by a processor, generates content for presentation to the user. Content generated by an application may be in response to inputs received from the user via movement of the user's eyes or inputs received from the input/output interface 140. Examples of the applications may include gaming applications, conferencing applications, video playback application, or other suitable applications.

Headset tracking module 114 may track movements of near-eye display 120 using slow calibration information from external imaging device 150. For example, headset tracking module 114 may determine positions of a reference point of near-eye display 120 using observed locators from the slow calibration information and a model of near-eye display 120. Headset tracking module 114 may also determine positions of a reference point of near-eye display 120 using position information from the fast calibration information. Additionally, in some embodiments, headset tracking module 114 may use portions of the fast calibration information, the slow calibration information, or any combination thereof, to predict a future location of near-eye display 120. Headset tracking module 114 may provide the estimated or predicted future position of near-eye display 120 to artificial reality engine 116.

Artificial reality engine 116 may execute applications within artificial reality system environment 100 and receive position information of near-eye display 120, acceleration information of near-eye display 120, velocity information of near-eye display 120, predicted future positions of near-eye display 120, or any combination thereof from headset tracking module 114. Artificial reality engine 116 may also receive estimated eye position and orientation information from eye-tracking module 118. Based on the received information, artificial reality engine 116 may determine content to provide to near-eye display 120 for presentation to the user. For example, if the received information indicates that the user has looked to the left, artificial reality engine 116 may generate content for near-eye display 120 that mirrors the user's eye movement in a virtual environment. Additionally, artificial reality engine 116 may perform an action within an application executing on console 110 in response to an action request received from input/output interface 140 and may provide feedback to the user indicating that the action has been performed. The feedback may be visual or audible feedback via near-eye display 120 or haptic feedback via input/output interface 140.

Eye-tracking module 118 may receive eye-tracking data from eye-tracking unit 130 and determine the position of the user's eye based on the eye tracking data. The position of the eye may include an eye's orientation, location, or both relative to near-eye display 120 or any element thereof. Because the eye's axes of rotation change as a function of the eye's location in its socket, determining the eye's location in its socket may allow eye-tracking module 118 to more accurately determine the eye's orientation.

Figure 2:
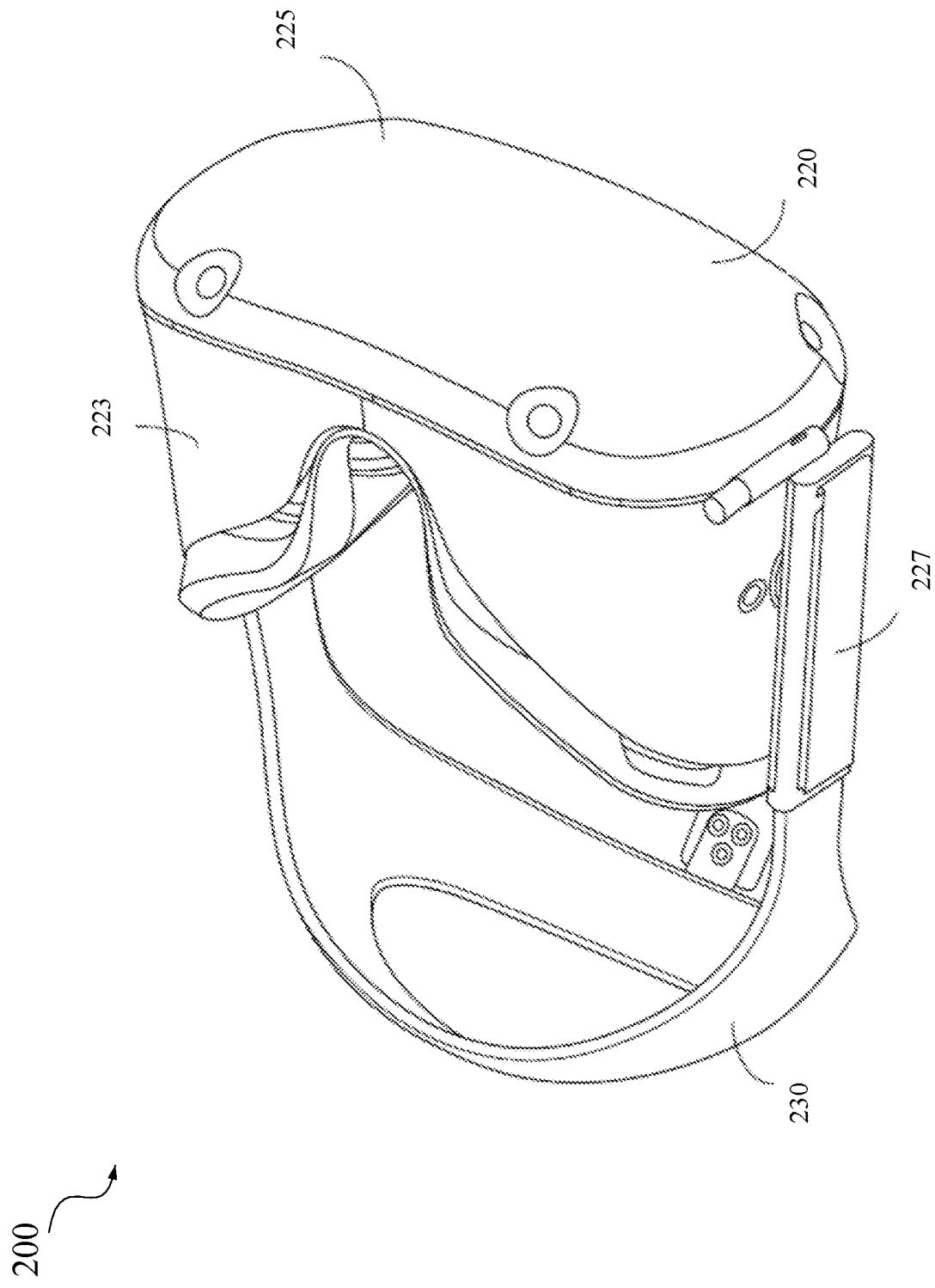
FIG. 2 is a perspective view of an example of a near-eye display in the form of a head-mounted display device for implementing some of the examples disclosed herein.

FIG. 2 is a perspective view of an example of a near-eye display in the form of an HMD device 200 for implementing some of the examples disclosed herein. HMD device 200 may be a part of, e.g., a VR system, an AR system, an MR system, or any combination thereof. HMD device 200 may include a body 220 and a head strap 230. FIG. 2 shows a bottom side 223, a front side 225, and a left side 227 of body 220 in the perspective view. Head strap 230 may have an adjustable or extendible length. There may be a space between body 220 and head strap 230 of HMD device 200 for allowing a user to mount HMD device 200 onto the user's head. In various embodiments, HMD device 200 may include additional, fewer, or different components. For example, in some embodiments, HMD device 200 may include eyeglass temples and temple tips as shown in, for example, FIG. 3 below, rather than head strap 230.

HMD device 200 may present to a user media including virtual and/or augmented views of a physical, real-world environment with computer-generated elements. Examples of the media presented by HMD device 200 may include images (e.g., two-dimensional (2D) or three-dimensional (3D) images), videos (e.g., 2D or 3D videos), audio, or any combination thereof. The images and videos may be presented to each eye of the user by one or more display assemblies (not shown in FIG. 2) enclosed in body 220 of HMD device 200. In various embodiments, the one or more display assemblies may include a single electronic display panel or multiple electronic display panels (e.g., one display panel for each eye of the user). Examples of the electronic display panel(s) may include, for example, an LCD, an OLED display, an ILED display, a µLED display, an AMO- LED, a TOLED, some other display, or any combination thereof. HMD device 200 may include two eye box regions.

In some implementations, HMD device 200 may include various sensors (not shown), such as depth sensors, motion sensors, position sensors, and eye tracking sensors. Some of these sensors may use a structured light pattern for sensing. In some implementations, HMD device 200 may include an input/output interface for communicating with a console. In some implementations, HMD device 200 may include a virtual reality engine (not shown) that can execute applications within HMD device 200 and receive depth information, position information, acceleration information, velocity information, predicted future positions, or any combination thereof of HMD device 200 from the various sensors. In some implementations, the information received by the virtual reality engine may be used for producing a signal (e.g., display instructions) to the one or more display assemblies. In some implementations, HMD device 200 may include locators (not shown, such as locators 126) located in fixed positions on body 220 relative to one another and relative to a reference point. Each of the locators may emit light that is detectable by an external imaging device.

Figure 3:
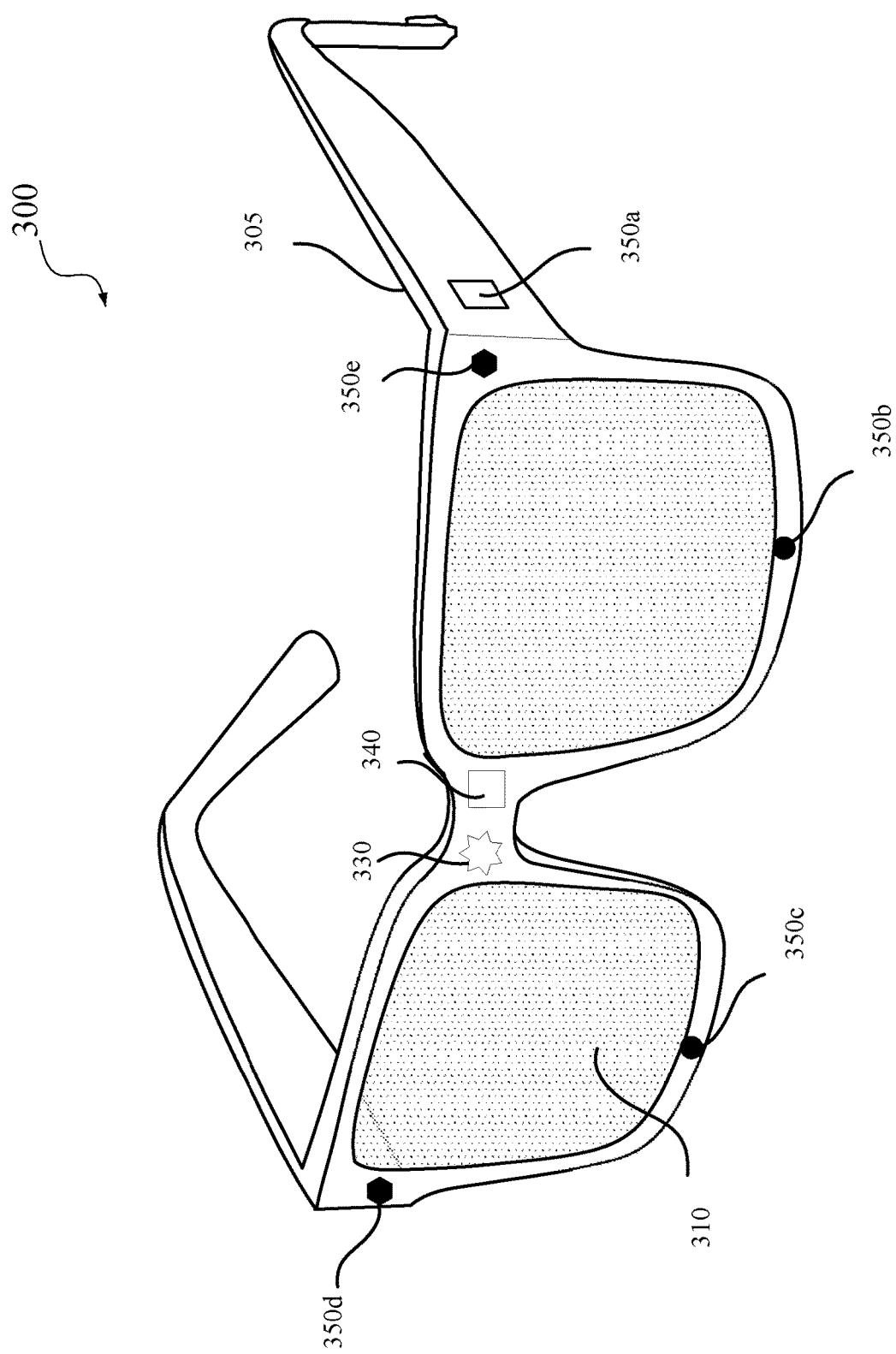
FIG. 3 is a perspective view of an example of a near-eye display in the form of a pair of glasses for implementing some of the examples disclosed herein.

FIG. 3 is a perspective view of an example of a near-eye display 300 in the form of a pair of glasses for implementing some of the examples disclosed herein. Near-eye display 300 may be a specific implementation of near-eye display 120 of FIG. 1 and may be configured to operate as a virtual reality display, an augmented reality display, and/or a mixed reality display. Near-eye display 300 may include a frame 305 and a display 310. Display 310 may be configured to present content to a user. In some embodiments, display 310 may include display electronics and/or display optics. For example, as described above with respect to near-eye display 120 of FIG. 1, display 310 may include an LCD display panel, an LED display panel, or an optical display panel (e.g., a waveguide display assembly).

Near-eye display 300 may further include various sensors 350a, 350b, 350c, 350d, and 350e on or within frame 305. In some embodiments, sensors 350a-350e may include one or more depth sensors, motion sensors, position sensors, inertial sensors, or ambient light sensors. In some embodiments, sensors 350a-350e may include one or more image sensors configured to generate image data representing different fields of views in different directions. In some embodiments, sensors 350a-350e may be used as input devices to control or influence the displayed content of near-eye display 300, and/or to provide an interactive VR/AR/MR experience to a user of near-eye display 300. In some embodiments, sensors 350a-350e may also be used for stereoscopic imaging.

In some embodiments, near-eye display 300 may further include one or more illuminators 330 to project light into the physical environment. The projected light may be associated with different frequency bands (e.g., visible light, infra-red light, ultra-violet light, etc.), and may serve various purposes. For example, illuminator(s) 330 may project light in a dark environment (or in an environment with low intensity of infra-red light, ultra-violet light, etc.) to assist sensors 350a-350e in capturing images of different objects within the dark environment. In some embodiments, illuminator(s) 330 may be used to project certain light patterns onto the objects within the environment. In some embodiments, illuminator(s) 330 may be used as locators, such as locators 126 described above with respect to FIG. 1.

In some embodiments, near-eye display 300 may also include a high-resolution camera 340. Camera 340 may capture images of the physical environment in the field of view. The captured images may be processed, for example, by a virtual reality engine (e.g., artificial reality engine 116 of FIG. 1) to add virtual objects to the captured images or modify physical objects in the captured images, and the processed images may be displayed to the user by display 310 for AR or MR applications.

Figure 4:
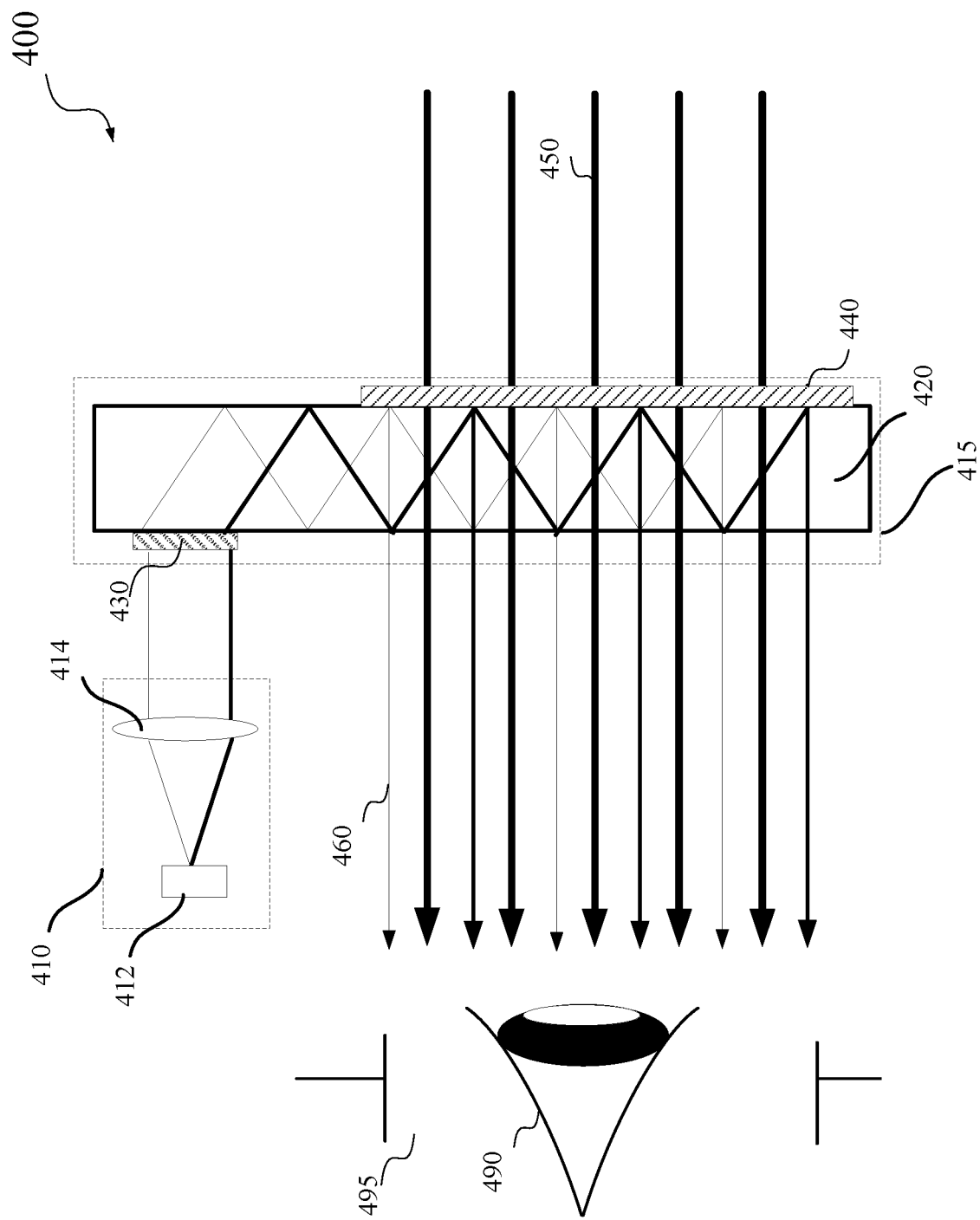
FIG. 4 illustrates an example of an optical see-through augmented reality system including a waveguide display according to certain embodiments.

FIG. 4 illustrates an example of an optical see-through augmented reality system 400 including a waveguide display according to certain embodiments. Augmented reality system 400 may include a projector 410 and a combiner 415. Projector 410 may include a light source or image source 412 and projector optics 414. In some embodiments, light source or image source 412 may include one or more micro-light emitting diode (micro-LED) or mini-LED devices described above. In some embodiments, image source 412 may include a plurality of pixels that displays virtual objects, such as an LCD display panel or an LED display panel. In some embodiments, image source 412 may include a light source that generates coherent or partially coherent light. For example, image source 412 may include a laser diode, a vertical cavity surface emitting laser, an LED, and/or a micro-LED described above. In some embodiments, image source 412 may include a plurality of light sources (e.g., an array of micro-LEDs described above), each emitting a monochromatic image light corresponding to a primary color (e.g., red, green, or blue). In some embodiments, image source 412 may include three two-dimensional arrays of micro-LEDs, where each two-dimensional array of micro-LEDs may include micro-LEDs configured to emit light of a primary color (e.g., red, green, or blue). In some embodiments, image source 412 may include an optical pattern generator, such as a spatial light modulator. Projector optics 414 may include one or more optical components that can condition the light from image source 412, such as expanding, collimating, scanning, or projecting light from image source 412 to combiner 415. The one or more optical components may include, for example, one or more lenses, liquid lenses, mirrors, apertures, and/or gratings. For example, in some embodiments, image source 412 may include one or more one-dimensional arrays or elongated two-dimensional arrays of micro-LEDs, and projector optics 414 may include one or more one-dimensional scanners (e.g., micro-mirrors or prisms) configured to scan the one-dimensional arrays or elongated two-dimensional arrays of micro-LEDs to generate image frames. In some embodiments, projector optics 414 may include a liquid lens (e.g., a liquid crystal lens) with a plurality of electrodes that allows scanning of the light from image source 412.

Combiner 415 may include an input coupler 430 for coupling light from projector 410 into a substrate 420 of combiner 415. Combiner 415 may transmit at least 50% of light in a first wavelength range and reflect at least 25% of light in a second wavelength range. For example, the first wavelength range may be visible light from about 400 nm to about 650 nm, and the second wavelength range may be in the infrared band, for example, from about 800 nm to about 1000 nm. Input coupler 430 may include a volume holographic grating, a diffractive optical element (DOE) (e.g., a surface-relief grating), a slanted surface of substrate 420, or a refractive coupler (e.g., a wedge or a prism). For example, input coupler 430 may include a reflective volume Bragg grating or a transmissive volume Bragg grating. Input coupler 430 may have a coupling efficiency of greater than 30%, 50%, 75%, 90%, or higher for visible light. Light coupled into substrate 420 may propagate within substrate 420 through, for example, total internal reflection (TIR). Substrate 420 may be in the form of a lens of a pair of eyeglasses. Substrate 420 may have a flat or a curved surface, and may include one or more types of dielectric materials, such as glass, quartz, plastic, polymer, poly(methyl methacrylate) (PMMA), crystal, or ceramic. A thickness of the substrate may range from, for example, less than about 1 mm to about 10 mm or more. Substrate 420 may be transparent to visible light.

Substrate 420 may include or may be coupled to a plurality of output couplers 440, each configured to extract at least a portion of the light guided by and propagating within substrate 420 from substrate 420, and direct extracted light 460 to an eyebox 495 where an eye 490 of the user of augmented reality system 400 may be located when augmented reality system 400 is in use. The plurality of output couplers 440 may replicate the exit pupil to increase the size of eyebox 495 such that the displayed image is visible in a larger area. As input coupler 430, output couplers 440 may include grating couplers (e.g., volume holographic gratings or surface-relief gratings), other diffraction optical elements, prisms, etc. For example, output couplers 440 may include reflective volume Bragg gratings or transmissive volume Bragg gratings. Output couplers 440 may have different coupling (e.g., diffraction) efficiencies at different locations. Substrate 420 may also allow light 450 from the environment in front of combiner 415 to pass through with little or no loss. Output couplers 440 may also allow light 450 to pass through with little loss. For example, in some implementations, output couplers 440 may have a very low diffraction efficiency for light 450 such that light 450 may be refracted or otherwise pass through output couplers 440 with little loss, and thus may have a higher intensity than extracted light 460. In some implementations, output couplers 440 may have a high diffraction efficiency for light 450 and may diffract light 450 in certain desired directions (i.e., diffraction angles) with little loss. As a result, the user may be able to view combined images of the environment in front of combiner 415 and images of virtual objects projected by projector 410.

In some embodiments, display optics 124 or projector optics 414 may display image content optically (e.g., using optical waveguides and optical couplers), correct optical errors associated with the image light, combine images of virtual objects and real objects, and present the corrected image light to the user's eyes. The display optics or projector optics may relay the image to create virtual images that appear to be away from the image source and further than just a few centimeters away from the eyes of the user. For example, the display optics or projector optics may collimate light from the image source to create a virtual image that may appear to be far away, and convert spatial information of the displayed virtual objects into angular information. The display optics or projector optics may also magnify the image source to make the image appear larger than the actual size of the image source. The display optics or projector optics may be large and heavy if implemented using conventional optics. In some implementations, folded optics including reflective optical elements may be used to implement compact near-eye display systems. In some embodiments, liquid crystal-on-silicon (LCoS) projection display systems may be used to implement near-eye display systems.

Figure 5:
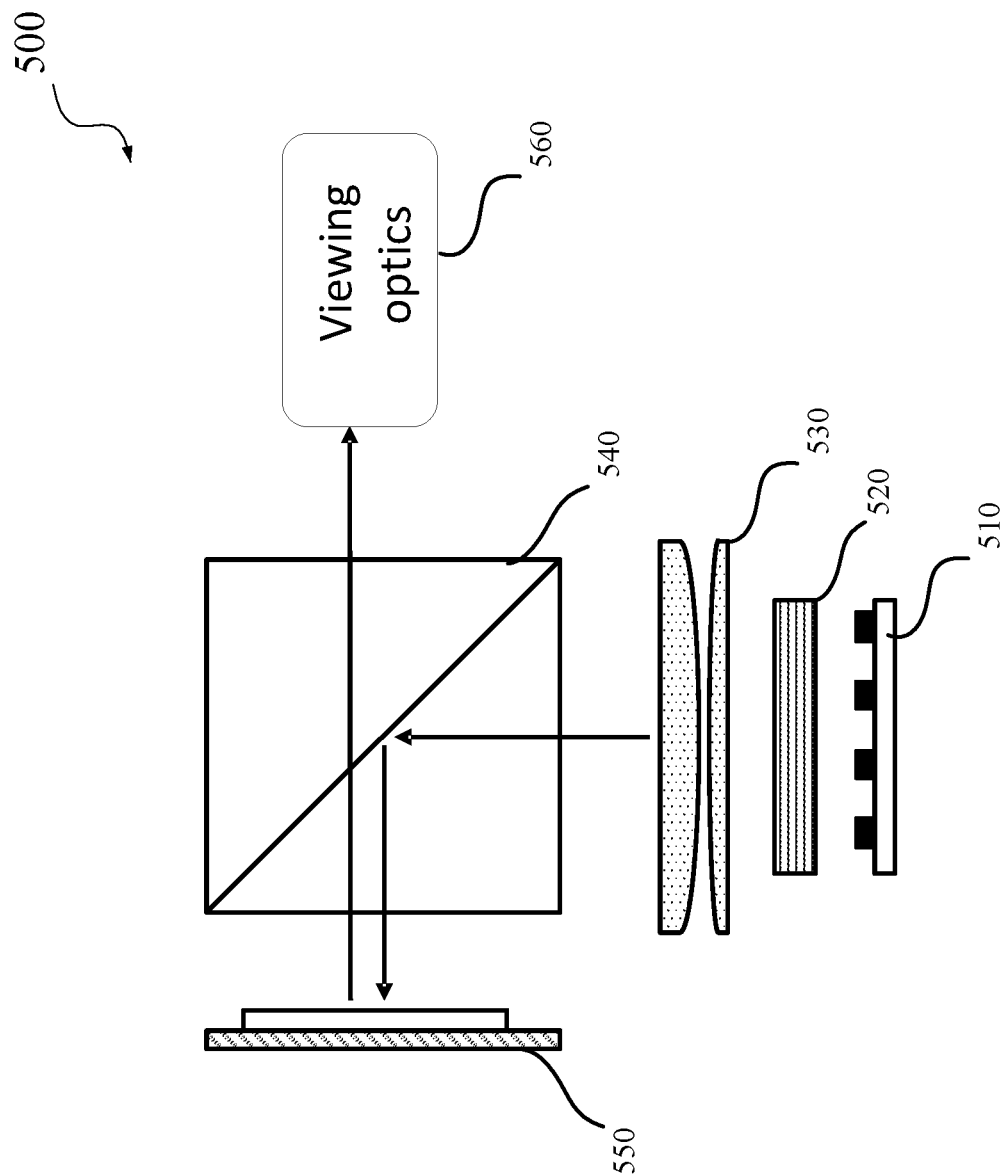
FIG. 5 depicts an example of a liquid crystal-on-silicon (LCoS) projection display system according to certain embodiments.

FIG. 5 illustrates an example of a LCoS projection display system 500 according to certain embodiments. LCoS techniques utilize liquid crystal materials that can be electrically modulated by high-performance silicon complementary metal oxide semiconductor (CMOS) circuits to modulate the phase and/or polarization of incident light. LCoS micro-display devices may also be referred to as spatial light modulators (SLM) and can be either transmissive or reflective. In the illustrated example, LCoS projection display system 500 includes a reflective LCoS micro-display device 550. LCoS micro-display device 550 may include a CMOS backplane, reflectors (e.g., aluminum mirrors) deposited on the surface of the CMOS backplane, and a low-absorption liquid crystal layer. The CMOS backplane may apply voltage signals to control the polarization direction and/or the phase retardation of incident light. For example, the polarization direction of the incident light may be changed in order to change the amplitude of the light that passes through a linear polarizer. LCoS projection display may generally need polarized input light.

In the example shown in FIG. 5, LCoS projection display system 500 includes a light source 510 (e.g., one or more LEDs or micro-LED arrays) that may emit light in one or more colors (e.g., red, blue, and green light). In some embodiments, red, green, and blue LEDs or micro-LEDs may be turned on and off sequentially to emit light of different colors sequentially. The emitted light may be converted to polarized light (e.g., linearly polarized light) by a polarization conversion element 520. The emitted light may also be magnified or collimated by magnification optics 530 and sent to a polarization beam splitter (PBS) 540. The light incident on PBS 540 may be polarized light (e.g., s-wave) with uniform spatial intensity distribution. In some embodiments, polarization conversion element 520 may be after magnification optics 530 in the optical path, such that the emitted light from light source 510 may be magnified and/or collimated by magnification optics 530 and then converted to polarized light by polarization conversion element 520.

PBS 540 may transmit p-wave light while reflecting s-wave light. Thus, s-wave light beam from polarization conversion element 520 and magnification optics 530 may be reflected by PBS 540 towards LCoS micro-display device 550. When polarized light is incident on LCoS micro-display device 550, its polarization state may be modulated by the liquid crystal layer and may be reflected by the reflectors (e.g., aluminum mirrors) back to PBS 540. PBS 540 may split the modulated light by reflecting s-wave light and transmitting p-wave light towards viewing optics 560 (e.g., one or more lenses) for displaying to the user. The intensity of the light displayed to the user may be controlled by, for example, controlling the polarization modulation of the pixels of LCoS micro-display device 550 by applying appropriate voltage signals to the pixels of LCoS micro-display device 550. For example, the intensity of an image pixel may be higher when the light reflected by a corresponding pixel of LCoS micro-display device 550 has a larger p-wave component that may pass through PBS 540 and reach user's eyes.

It is note that the example show in FIG. 5 is for illustration purposes only. LCoS projection display systems may have many different structures. For example, a LCoS projection display system may be a back-lit, front-lit, or free-space-lit LCoS projection display system. In addition, there may be many different methods to combine illumination light of different colors to illuminate the LCoS micro-display device. Some examples of beam combiner/splitter structures are described below.

FIG. 6A illustrates an example of a LCoS projection display system 600 according to certain embodiments. LCoS projection display system 600 may include a LCoS micro-display device 610, which may be similar to LCoS micro-display device 550 described above. LCoS projection display system 600 may also include a PBS 620, which may be similar to PBS 540 described above. LCoS projection display system 600 may further include a beam combiner structure that includes a beam combiner 640 (e.g., a PBS) and magnification optics 630 and 650, which may magnify and/or collimate incoming light beams. In the example illustrated in FIG. 6A, a first beam (e.g., in a first color, such as red, green, or blue) may be magnified and/or collimated by magnification optics 650 and may then be reflected by beam combiner 640 towards magnification optics 630 and PBS 620. In some embodiments, the first beam may be a polarized beam generated by a light source and a polarization conversion element disclosed herein. In some embodiments, the first beam may be an unpolarized beam, and beam combiner 640 may only reflect a polarization component (e.g., s-wave) of the first beam towards PBS 620 (where other polarization components may be lost). Two beams 690 of different colors (e.g., two primary colors that are different from the color of the first beam) may pass through beam combiner 640 and reach magnification optics 630 and PBS 620. The two beams 690 of different colors may be polarized light (e.g., generated using polarization conversion elements disclosed herein) or unpolarized light (but may be polarized by beam combiner 640). PBS 620 may reflect the incident polarized light (e.g., s-wave light) to LCoS micro-display device 610, which may modulate the polarization state of the incoming beam and reflect the modulated light back to PBS 620 for displaying to user's eyes as described above.

FIG. 6B illustrates another example of a LCoS projection display system 602 according to certain embodiments. LCoS projection display system 602 may include LCoS micro-display device 610 and PBS 620 as described above. LCoS projection display system 602 may also include a beam combiner structure that includes a beam combiner 632 and two or more light sources 642 and 652. In the example illustrated in FIG. 6B, beam combiner 632 may be an edge-lit waveguide, where light emitted by light source 642 may be coupled into the edge-lit waveguide from one edge and light emitted by light source 652 may be coupled into the edge-lit waveguide from another edge. The light coupled into the edge-lit waveguide may be coupled out of the edge-lit waveguide (e.g., by a prism or a grating) and incident on PBS 620. The operations of PBS 620 and LCoS micro-display device 610 may be similar to the operations described above with respect to FIGS. 5 and 6A. In some embodiments, light emitted by light sources 642 and 652 may be polarized by polarization conversion elements (not shown in FIG. 6B) before being coupled into beam combiner 632. In some embodiments, light coupled out of beam combiner 632 may be polarized by a polarization conversion element (not shown in FIG. 6B) before reaching PBS 620.

FIG. 6C illustrates an example of a beam combiner 604 for LCoS projection display systems according to certain embodiments. In the illustrated example, beam combiner 604 may include an X-cube 660 for combining light beams of different colors. For example, light emitters 644, 646, and 648 may each include an LED or an LED array that emits light in a respective primary color, such as red, green, or blue light. Light emitted by a first light emitter 644 may be collimated by a first lens 634 and reflected by X-cube 660 towards one direction (e.g., to the right in the illustrated example). Light emitted by a second light emitter 646 may be collimated by a second lens 636 and transmitted by X-cube 660 without changing the propagation direction (e.g., to the right). Light emitted by a third light emitter 648 may be collimated by a third lens 638 and reflected by X-cube 660 towards the same direction (e.g., to the right). In this way, light emitted by the three light emitters may be combined. In some embodiments, light emitted by light emitters 644, 646, and 648 may be polarized by polarization conversion elements (not shown in FIG. 6C) disclosed herein before or after being collimated by lenses 634, 636, and 638, respectively.

FIG. 6D illustrates another example of a beam combiner 606 for LCoS projection display systems according to certain embodiments. In the illustrated example, beam combiner 606 may include prisms 662 and 664 that form a folded prism structure for combining light beams of different colors. For example, light emitters 644, 646, and 648 may each include an LED or an LED array that emits light in a respective primary color, such as red, green, or blue light. Light emitted by first light emitter 644 may be collimated by first lens 634 and reflected by prisms 662 and 664 towards one direction (e.g., an upwards direction in the illustrated example). Light emitted by second light emitter 646 may be collimated by second lens 636 and then transmitted by prism 662 and reflected by prism 664 towards the same direction (e.g., the upwards direction). Light emitted by third light emitter 648 may be collimated by third lens 638 and then transmitted by prism 664 towards the same direction (e.g., the upwards direction). Thus, light emitted by the three light emitters may be combined. In some embodiments, prisms 662 and 664 may be polarization beam splitters, and light emitted by light emitters 644, 646, and 648 may be polarized by polarization conversion elements (not shown in FIG. 6D) disclosed herein before or after being collimated by lenses 634, 636, and 638, respectively.

FIG. 6E illustrates another example of a beam combiner 608 for LCoS projection display systems according to certain embodiments. In the illustrated example, beam combiner 608 may include prisms 662, 664, and 666 that form a linear prism structure for combining light beams of different colors. For example, light emitters 644, 646, and 648 may each include an LED or an LED array that emits light in a respective primary color, such as red, green, or blue light. Light emitted by first light emitter 644 may be collimated by first lens 634, reflected by prism 662, and transmitted by prism 664 towards one direction (e.g., to the right in the illustrated example). Light emitted by second light emitter 646 may be collimated by second lens 636, reflected by prism 666, and transmitted by prisms 662 and 664 towards the same direction (e.g., to the right). Light emitted by third light emitter 648 may be collimated by third lens 638 and then reflected by prism 664 towards the same direction (e.g., to the right). Thus, light emitted by the three light emitters may be combined. In some embodiments, prisms 662 and 664 may be polarization beam splitters, and light emitted by light emitters 644, 646, and 648 may be polarized by polarization conversion elements (not shown in FIG. 6E) disclosed herein before or after being collimated by lenses 634, 636, and 638, respectively.

Figure 7:
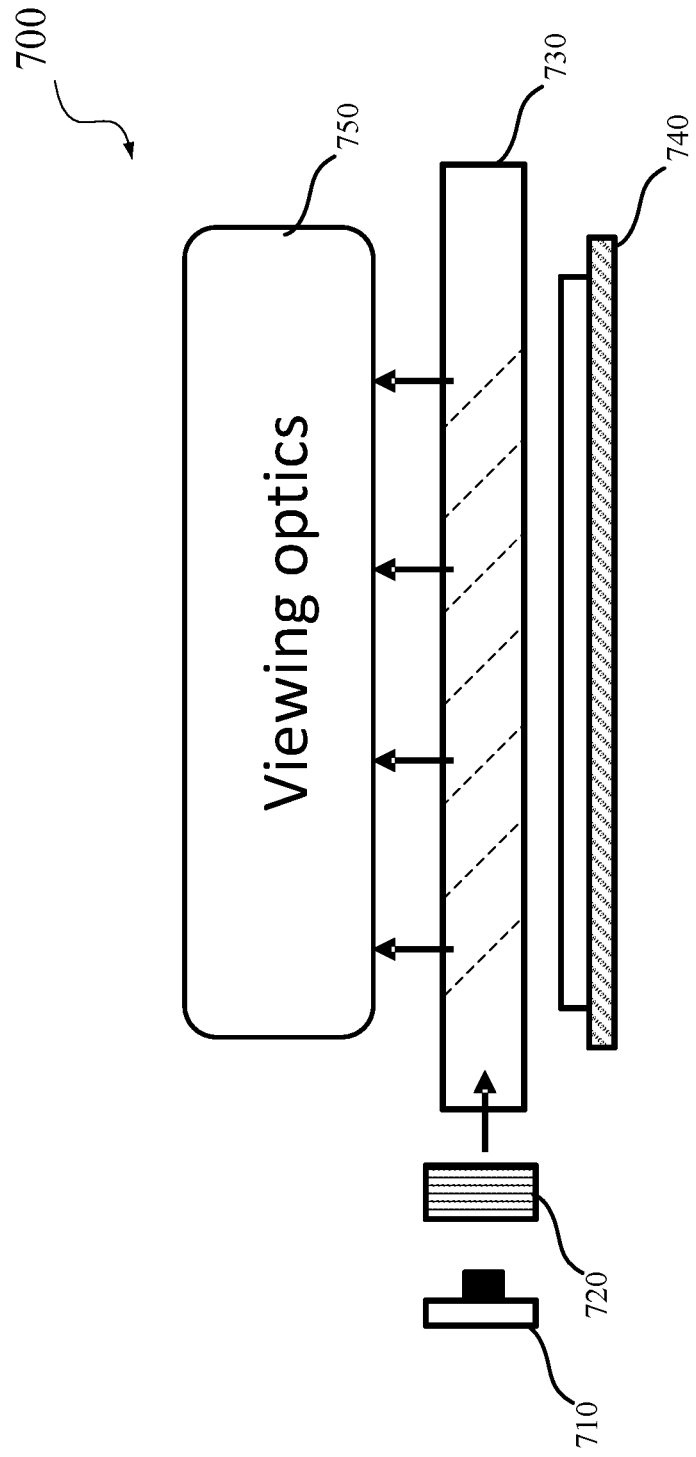
FIG. 7 illustrates another example of a LCoS projection display system according to certain embodiments.

FIG. 7 illustrates another example of a LCoS projection display system 700 according to certain embodiments. LCoS projection display system 700 may include a light source 710 (e.g., one or more LEDs or LED arrays) that may emit light in one or more colors (e.g., red, blue, and green light). In some embodiments, red, green, and blue LEDs may be turned on and off sequentially to emit light of different colors sequentially. The emitted light may be converted to polarized light (e.g., linearly polarized light) by polarization conversion element 720. The emitted light may optionally be magnified or collimated by magnification optics (not shown in FIG. 7) and sent to a waveguide combiner 730. Waveguide combiner 730 may include one or more input couplers that may couple light from light source 710 into waveguide combiner, and may also include one or more output couplers that may couple light out of waveguide combiner 730 to illuminate a LCoS micro-display device 740, which may modulate and reflect the illumination light back to waveguide combiner 730 as described above. In some embodiments, waveguide combiner 730 may selectively transmit polarized light towards viewing optics 750 (e.g., including one or more lenses) for displaying to the user. Waveguide combiner 730 may include, for example, an array of beam splitters, a one-dimensional or two-dimensional pupil expansion structure (e.g., a set of gratings), and the like. Couplers for coupling light into or out of waveguide combiner 730 may include, for example, edge couplers, surface-relief gratings, volume Bragg gratings, polarization volume gratings, or the like. The couplers may be polarization sensitive or may not be polarization sensitive.

In some display systems, polarization conversion elements or polarizers may be used to polarize a light beam to improve the coupling efficiencies of the light beam into a waveguide. In some display systems, polarization conversion elements or polarizers may be used to multiplex light for different fields of view or from different view angles. For example, light from a left field of view may be polarized to a first polarization state, light from a right field of view may be polarized to a second polarization state, and the light in the first polarization state and light in the second polarization state may be multiplexed and sent through the display optics in a display system. In some optical systems, polarization conversion elements or polarizers may be used to split light beams, combine light beams, or otherwise perform different processing on different polarization components of light beams. For example, polarization conversion elements may be used to convert light emitted by light sources into polarized light to illuminate a LCoS micro-display device described above.

Various types of polarization conversion elements or polarizers may be used in these applications, such as absorbance polarizers (or dichroic polarizers), thin-film polarizers, birefringent polarizing beam splitters, wire grid polarizers, and the like. It is generally desirable that the power loss during the polarization conversion and/or the polarized light generation is as low as possible for light in a wide wavelength range and from a wide angular range.

Figure 8A:
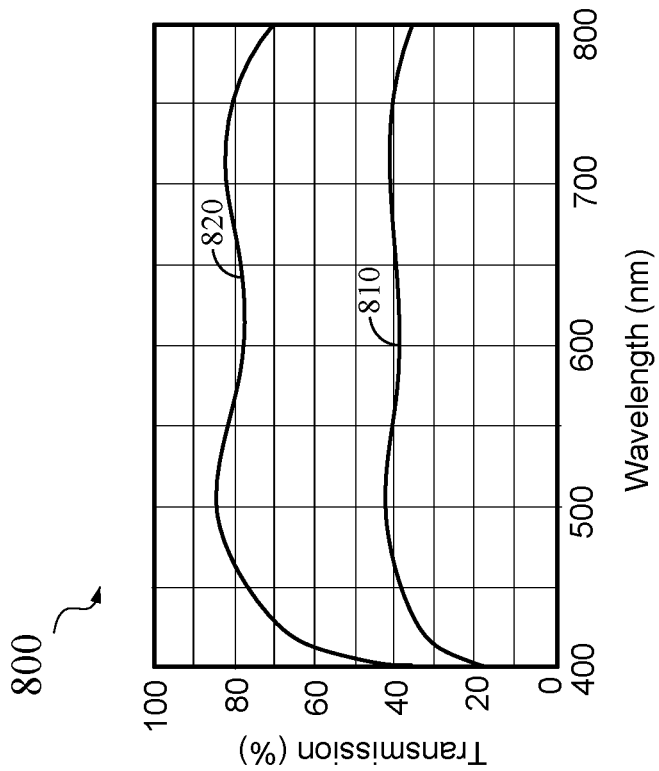
FIG. 8A illustrates the transmission efficiency of an example of an absorbance polarizer as a function of the wavelength of the incident light.

FIG. 8A includes a diagram 800 illustrating the transmission efficiency of an example of an absorbance polarizer for incident light of different wavelengths. The absorbance polarizer may include, for example, crystalline materials, polymer materials, or metal nanoparticles that may absorb more light in one incident plane than light in another incident plane (referred to as dichroic materials) such that light passing through the materials may become more and more polarized as it propagates within the materials. Due to light absorption, the transmission efficiency of the absorbance polarizer may be low for input light that is unpolarized.

In the example shown in FIG. 8A, the light transmission efficiency of the absorbance polarizer for unpolarized light with a wavelength in the range of about 400 nm to about 800 nm is shown by a curve 810, where the light transmission efficiency may be about 40% or lower. The light transmission efficiency of the absorbance polarizer for polarized light with a wavelength in the range of about 400 nm to about 800 nm is shown by a curve 820, where the light transmission efficiency may be about 80% or lower. As shown by FIG. 8A, for unpolarized light, more than one half of the incident light may be absorbed and thus may not pass through the absorbance polarizer. Therefore, the light transmission efficiency of the absorbance polarizer for unpolarized light may be about a half of the light transmission efficiency of the absorbance polarizer for polarized light.

Figure 8B:
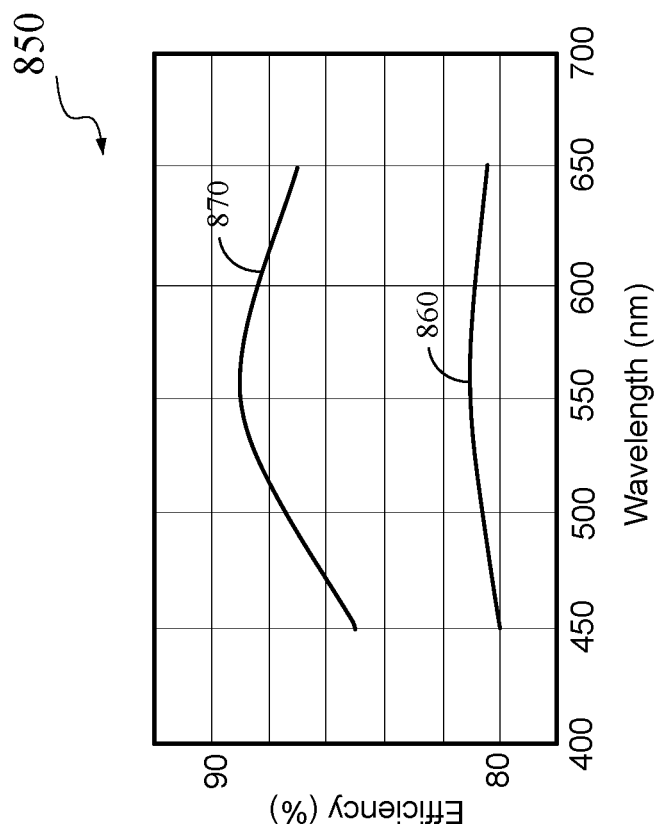
FIG. 8B illustrates the transmission efficiency of examples of polarization beam splitters as a function of the wavelength of the incident light.

FIG. 8B includes a diagram 850 illustrating the transmission efficiencies of examples of polarizing beam splitters, where light in one polarization state may pass through the polarizing beam splitters, while light in another (e.g., orthogonal) polarization state may be sent to another directions (e.g., deflected by 90°). The polarizing beam splitters may include a birefringent material, such as quartz ($SiO_2$), calcite ($CaCO_3$), yttrium vanadate ($YVO_4$), beta barium borate (BBO), or magnesium fluoride ($MgF_2$). For example, some polarizing beam splitters may include two pieces of such a material (with different orientations of the optical axis) coupled together (or joined with a small air space).

In the examples shown in FIG. 8B, a curve 860 shows the efficiency of a polarizing beam splitter, such as a polarizing cube (e.g., a Glan-Taylor prism), for light with a wavelength within a range between about 450 nm and about 650 nm. The efficiency indicates how efficient a randomly polarized beam is converted into reflected (e.g., s-polarized) light and transmitted (e.g., p-polarized) light. A curve 870 shows the efficiency of a high efficiency polarizing beam splitter (HEPBS), such as a wire grid polarizing beam splitter. As shown by curve 870, the efficiency of the HEPBS may still be lower than 90%.

According to certain embodiments, a polarization converter or polarization beam generator may include a polarization-dependent grating and an angular selective waveplate arranged in a stack. The polarization-dependent grating may diffract incident light in different polarization states to different directions. For example, the polarization-dependent grating may include a geometric phase grating, such as a Pancharatnam-Berry phase (PBP) grating, that may diffract an unpolarized incident beam into a first light beam that is right-handed circularly polarized and propagates in a first direction, and a second light beam that is left-handed circularly polarized and propagates in a second direction. The angular selective waveplate may maintain or change the polarization state of an incident light beam, depending on the incident angle and the polarization state of the incident light beam. For example, the angular selective waveplate may maintain the polarization state of the right-handed circularly polarized light beam propagating in the first direction, while changing the polarization state of the left-handed circularly polarized light beam propagating in the second direction to right-handed circular polarization. As such, the light beams after passing through the angular selective waveplate may have the same polarization state (e.g., right-handed circular polarization). The light beams may optionally be filtered by a polarizer to remove components in other polarization states (if any). In some embodiments, the light beams may be collimated (or focused) by a geometric phase lens, such as a PBP lens, which may also change the polarization states of the beams, such as from right-handed circular polarization to left-handed circular polarization. In some embodiments, a waveplate (e.g., a quarter-wave plate) may be used to convert the circularly polarized beam to a linearly polarized beam.

Figure 9:
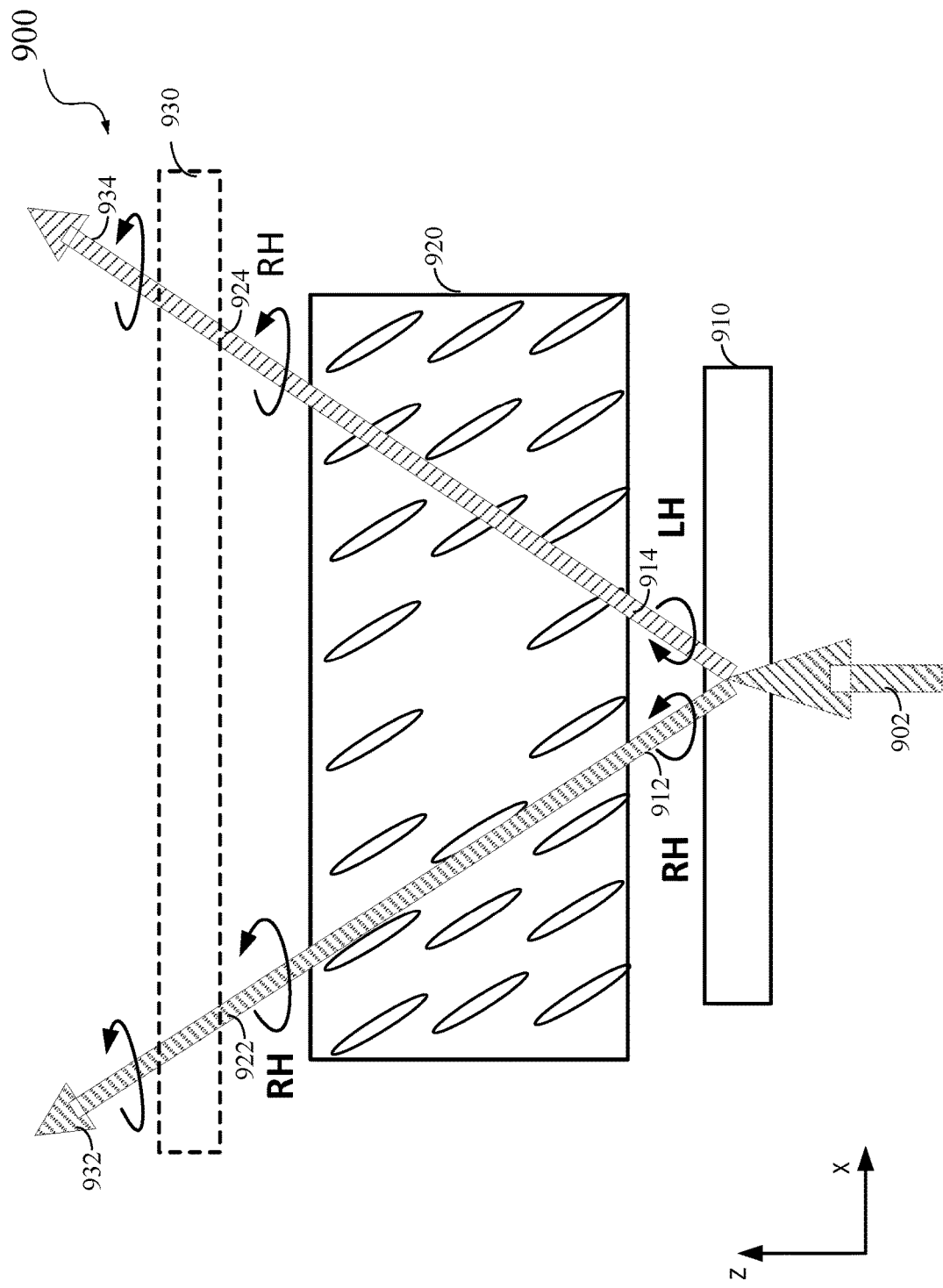
FIG. 9 illustrates an example of a polarization converter according to certain embodiments.

FIG. 9 illustrates an example of a polarization converter 900 (e.g., a polarizer) according to certain embodiments. Polarization converter 900 may be used as, for example, polarization conversion elements 520 and 720 described above. Polarization converter 900 may include a polarization-dependent grating 910 (e.g., a geometric phase grating, such as a PBP grating) and an angular selective waveplate 920. Each of polarization-dependent grating 910 and angular selective waveplate 920 may have a thickness of a few microns or a few tens of microns (e.g., less than about 100, 50, 20, or 10 µm). In some embodiments, polarization-dependent grating 910 and angular selective waveplate 920 may be in physical contact to form a stack of thin layers. In some embodiments, polarization-dependent grating 910 and angular selective waveplate 920 may be spaced apart, for example, by a spacer. Polarization-dependent grating 910 may diffract an unpolarized (or partially polarized) incident beam 902 into a first portion 912 that has a first polarization state (e.g., right-handed circular polarization) and propagates in a first direction, and a second portion 914 that has a second polarization state (e.g., left-handed circular polarization) and propagates in a second direction. Angular selective waveplate 920 may function as a zero or full-wave plate for first portion 912 propagating in the first direction and may function as a half-wave plate for second portion 914 propagating in the second direction. Thus, angular selective waveplate 920 may maintain the first polarization state of first portion 912 (e.g., right-handed circularly polarized beam) propagating in the first direction, while changing the second polarization state of the second portion 914 (e.g., left-handed circularly polarized beam) propagating in the second direction to the first polarization state (e.g., right-handed circular polarization). As such, the first portion 912 after passing through angular selective waveplate 920 may become a light beam 922 that has a same polarization state (e.g., right-handed circular polarization) as first portion 912. The second portion 914 after passing through angular selective waveplate 920 may become a light beam 924 that has a same polarization state (e.g., right-handed circular polarization) as light beam 922.

In some circumstances, light beam 924 and/or light beam 922 may have an elliptical polarization state. Polarization converter 900 may optionally include a circular polarizer 930, such as a right-handed circular polarizer that allows right-handed circularly polarized light to pass through while blocking light of other polarization states. As such, light beam 922 and light beam 924 may become right-handed circularly polarized light beams 932 and 934, respectively. In some embodiments, light beams 932 and 934 may be collimated by a lens (not shown in FIG. 9), such as a refractive lens, a Fresnel lens, or a geometric phase lens (e.g., a PBP lens) that may also change the polarization state of light beams 932 and 934, such as from right-handed circular polarization to left-handed circular polarization. In some embodiments, a quarter-wave plate (not shown in FIG. 9) may be used to convert the collimated circularly polarized light to linearly polarized light.

Figure 10B:
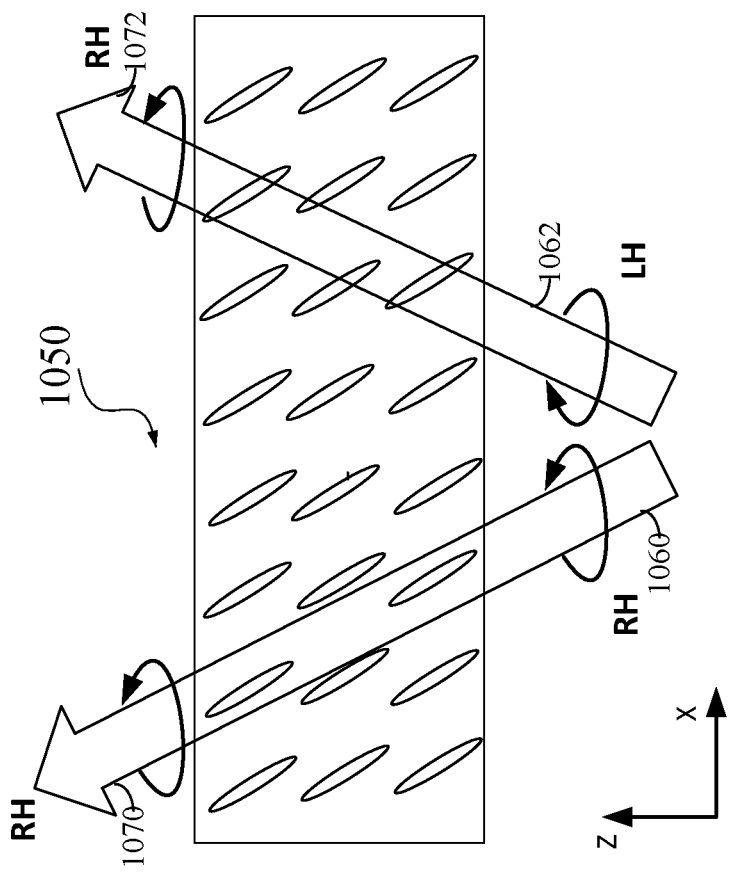
FIG. 10B illustrates an example of an angular selective waveplate according to certain embodiments.
Figure 10A:
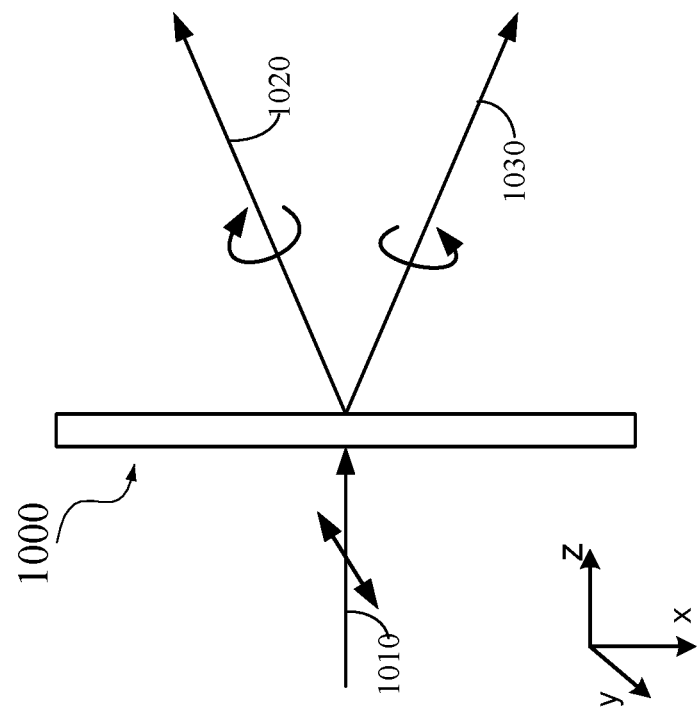
FIG. 10A illustrates an example of a Pancharatnam-Berry phase (PBP) grating for polarization conversion according to certain embodiments.

FIG. 10A illustrates an example of a polarization-dependent grating 1000 (e.g., a geometric phase grating) according to certain embodiments. Polarization-dependent grating 1000 may be an example of polarization-dependent grating 910. In the illustrated example, polarization-dependent grating 1000 may be a PBP grating that includes liquid crystal molecules with an in-plane rotation alignment. Polarization-dependent grating 1000 may diffract an incident linearly polarized light beam 1010 into a left-handed circularly polarized light beam 1020 (e.g., in the −1st order) and a right-handed circularly polarized light beam 1030 (e.g., in the +1st order), where the diffraction angles of left-handed circularly polarized light beam 1020 and right-handed circularly polarized light beam 1030 may depend on the grating period (e.g., in the x direction) of polarization-dependent grating 1000.

FIG. 10B illustrates an example of an angular selective waveplate 1050 according to certain embodiments. Angular selective waveplate 1050 may be an example of angular selective waveplate 920. Angular selective waveplate 1050 may also include liquid crystal molecules arranged in a certain pattern such that angular selective waveplate 1050 may be birefringent. In the illustrated example, a right-handed circularly polarized beam 1060 propagating in a first direction may pass through angular selective waveplate 1050 as a light beam 1070 that remains right-handed circularly polarized. A left-handed circularly polarized beam 1062 propagating in a second direction may pass through angular selective waveplate 1050 (functioning as a half-wave plate) as a light beam 1072 that may become a right-handed circularly polarized or elliptically polarized light beam.

FIG. 11A is a view of an x-z plane of an example of a PBP grating 1100 according to certain embodiments. PBP grating 1100 may be an example of polarization-dependent grating 910 or 1000. In the illustrated example, PBP grating 1100 may include a pair of substrates 1110, one or two surface alignment layers 1120, and a liquid crystal layer 1130. Substrates 1110 may be transparent to visible light. Surface alignment layer(s) 1120 may have a predefined surface pattern, such that liquid crystal molecules in liquid crystal layer 1130 may self-align according to the predefined surface pattern. In some embodiments, PBP grating 1100 may include one substrate and a cured film attached to the substrate, or may include a freestanding film that does not need to be attached to a substrate.

FIG. 11B is a view of an x-y plane of the example of PBP grating 1100 according to certain embodiments. As illustrated, liquid crystal layer 1130 in PBP grating 1100 may include liquid crystal molecules that are oriented in a repetitive rotational pattern in the x-y plane when viewed in the light propagation direction (e.g., z direction). The repetitive rotational pattern may be created by, for example, recording the interference of two orthogonally circular-polarized laser beams in a polarization-sensitive photo-alignment material. Due to the repetitive rotational pattern of the liquid crystal structure in the x-y plane, PBP grating 1100 may have an in-plane, uniaxial birefringence that varies with position. The liquid crystal structure having the repetitive rotational pattern may give rise to a geometric-phase shift of incident light due to the polarization evolution as the light propagates through the liquid crystal structure.

The diffraction efficiency of PBP grating 1100 for surface-normal incidence may be approximately determined by:

$$\eta_0 = \cos^2\left(\frac{\pi \Delta n d}{\lambda}\right), \text{ and}$$

$$\eta_{\pm 1} = \frac{1 \mp S_3'}{2} \sin^2\left(\frac{\pi \Delta n d}{\lambda}\right),$$

where $n_m$ is the diffraction efficiency of the mth diffraction order, $\Delta n$ is the birefringence of liquid crystal layer 1130, d is the thickness of liquid crystal layer 1130, $\lambda$ is the wavelength of the incident light, and $S_3'=S_3/S_0$ is the normalized Stokes parameter corresponding to the ellipticity of the polarization of the incident light. Thus, if thickness $d=\lambda/2\Delta n$ (half-wave retardation of liquid crystal layer 1130), the zeroth order transmission $n_0$ may be zero, and all incident light may be diffracted to the ±1 diffraction orders. The ±1 diffraction orders may be sensitive to $S_3'$, while the zeroth order may be polarization independent. For example, when the incident light has a right-handed circular polarization, $S_3'=+1$, and thus $n_{+1}=0$ and $n_{-1}=1$, which indicates that all incident light passing through PBP grating 1100 may be diffracted into the −1 diffraction order. When the incident light has a left-handed circular polarization, $S_3'=-1$, $n_{+1}=1$, and $n_{-1}=0$, which indicates that all incident light is diffracted into the +1 diffraction order. Although m=+1 is herein considered the primary order and the m=−1 order is considered the conjugate order, the designation of the orders may be reversed or otherwise changed. In general, only the zeroth and the two first diffracted orders may be possible, regardless of the grating period A and the thickness d.

Moreover, after passing through PBP grating 1100, the handedness of the circularly polarized light may be changed to the opposite circular polarization state as the light may experience a relative phase shift about a half wavelength in liquid crystal layer 1130. For example, after the right-handed circularly polarized light ($S_3=1$) passes through PBP grating 1100, the polarization state of the light (e.g., in the −1 diffraction order) may be changed to the left-handed circular polarization ($S_3=-1$). After the left-handed circularly polarized light ($S_3=-1$) passes through PBP grating 1100, the polarization state of the light (e.g., in the −1 diffraction order) may be changed to the right-handed circular polarization ($S_3=1$).

The pitch or period A of the repetitive rotational pattern of the liquid crystal molecules in PBP grating 1100 may determine, in part, certain optical properties of the PBP grating. For example, the pitch may determine the diffraction angles of the different diffraction orders according to the grating equation. Generally, the smaller the pitch, the larger the diffraction angle for light of a given wavelength and a given diffraction order.

FIGS. 12A-12B illustrate operations of an example of a PBP grating 1200 according to certain embodiments. PBP grating 1200 may be an example of polarization-dependent grating 910 or 1000, or PBP grating 1100. In the illustrated example, PBP grating 1200 may include a pair of substrates 1210, one or two surface alignment layers 1220, and a liquid crystal layer 1230. Substrate 1210 may be transparent to visible light. Surface alignment layer(s) 1220 may have a predefined surface pattern, such that liquid crystal molecules in liquid crystal layer 1230 may self-align in the same pattern. In the illustrated example, PBP grating 1200 may be a right-handed grating, where the liquid crystal molecules in liquid crystal layer 1230 may be arranged in a clockwise rotational pattern in the x-y plane when viewed in the light propagation direction (e.g., the z direction).

FIG. 12A illustrates an example of the diffraction of a right-handed circularly polarized incident light beam by PBP grating 1200. PBP grating 1200 may diffract incident light with a right-handed circular polarization to a first direction, where the light output from PBP grating 1200 may become left-handed circularly polarized after passing through PBP grating 1200.

FIG. 12B illustrates an example of the diffraction of a left-handed circularly polarized incident light beam by PBP grating 1200. PBP grating 1200 may diffract incident light with the left-handed circular polarization to a second direction, where the light output from PBP grating 1200 may become right-handed circularly polarized after passing through PBP grating 1200.

FIGS. 12C-12D illustrate operations of an example of a PBP grating 1202 according to certain embodiments. PBP grating 1202 may be an example of polarization-dependent grating 901 or 1000, or PBP grating 1100, and may be similar to PBP grating 1200 but with light incident from an opposite direction. In the illustrated example, PBP grating 1202 may include a pair of substrates 1212, one or two surface alignment layers 1222, and a liquid crystal layer 1232. Substrate 1212 may be transparent to visible light. Surface alignment layer(s) 1222 may have a predefined surface pattern, such that liquid crystal molecules in liquid crystal layer 1232 may self-align in the same pattern. In the illustrate example, PBP grating 1202 may be a left-handed grating, where the liquid crystal molecules in liquid crystal layer 1230 may be arranged in a counter-clockwise rotational pattern in the x-y plane when viewed in the light propagation direction (e.g., the z direction).

FIG. 12C illustrates an example of the diffraction of a right-handed circularly polarized incident light beam by PBP grating 1202. PBP grating 1202 may diffract incident light with the right-handed circular polarization to a first direction, where the light output from PBP grating 1202 may become left-handed circularly polarized after passing through PBP grating 1202.

FIG. 12D illustrates an example of the diffraction of a left-handed circularly polarized incident light beam by PBP grating 1202. PBP grating 1202 may diffract the incident light with the left-handed circular polarization to a second direction, where the light output from PBP grating 1202 may become right-handed circularly polarized after passing through PBP grating 1202.

Angular selective waveplate 920 or 1050 may include an oblique-plate ("O-plate") waveplate. The O-plate waveplate may be homogeneous or may be splayed, and may have positive, negative, or biaxial anisotropy. A homogeneous O-plate may include liquid crystal molecules tilted uniformly at an oblique angle. A splayed O-plate (splayed plate) may include liquid crystal molecules oriented at different angles in different layers. The oblique angle range may be between about 0° and about 90°.

Figure 13A:
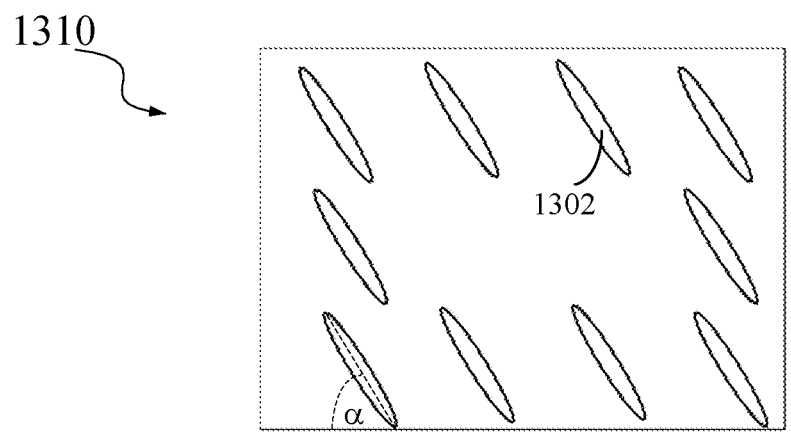
FIG. 13A illustrates an example of an angular selective waveplate according to certain embodiments.

FIG. 13A illustrates an example of an angular selective waveplate 1310 according to certain embodiments. Angular selective waveplate 1310 may be in the form of a thin film or a sandwiched cell including a layer of liquid crystal material between two transparent plates. In the example shown in FIG. 13A, angular selective waveplate 1310 may include an O-plate including liquid crystal molecules 1302 uniformly tilted at an oblique angle α (e.g., about 45°).

Figure 13B:
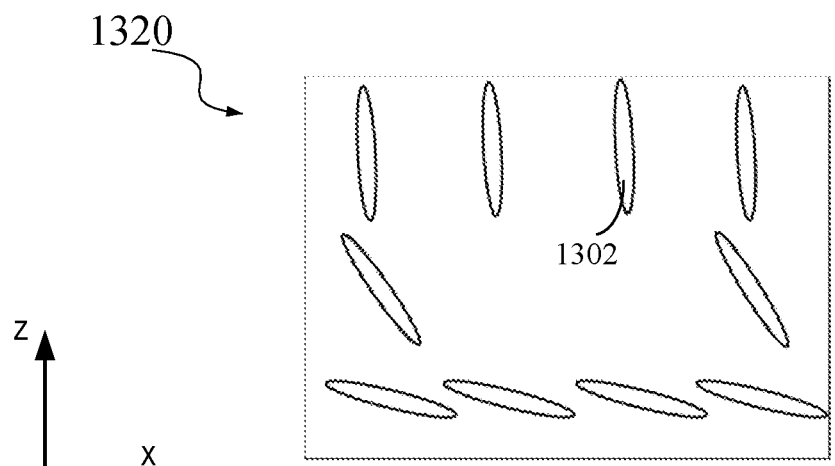
FIG. 13B illustrates another example of an angular selective waveplate according to certain embodiments.

FIG. 13B illustrates another example of an angular selective waveplate 1320 according to certain embodiments. Angular selective waveplate 1320 may be in the form of a thin film or a sandwiched cell including a layer of liquid crystal material between two transparent plates. In the example shown in FIG. 13B, angular selective waveplate 1320 may include a splayed plate including liquid crystal molecules 1302 oriented at different angles in different layers. For example, the orientation of liquid crystal molecules 1302 may gradually change from horizonal (about 0°) to vertical (about 90°) in the z direction in angular selective waveplate 1320.

Figure 13C:
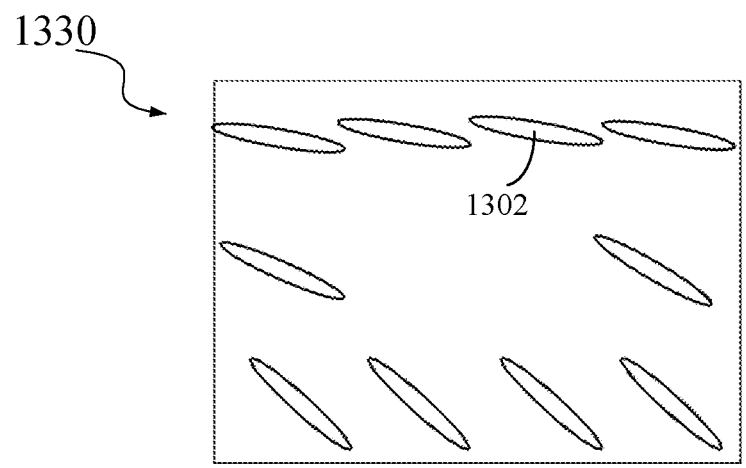
FIG. 13C illustrates yet another example of an angular selective waveplate according to certain embodiments.

FIG. 13C illustrates yet another example of an angular selective waveplate 1330 according to certain embodiments. Angular selective waveplate 1330 may be in the form of a thin film or a sandwiched cell including a layer of liquid crystal material between two transparent plates. In the example shown in FIG. 13C, angular selective waveplate 1330 may include a splayed plate including liquid crystal molecules 1302 aligned at different angles in different layers. For example, the orientation of liquid crystal molecules 1302 may gradually change from about 30° to horizontal (about 0°) in the z direction in angular selective waveplate 1330.

Figure 14:
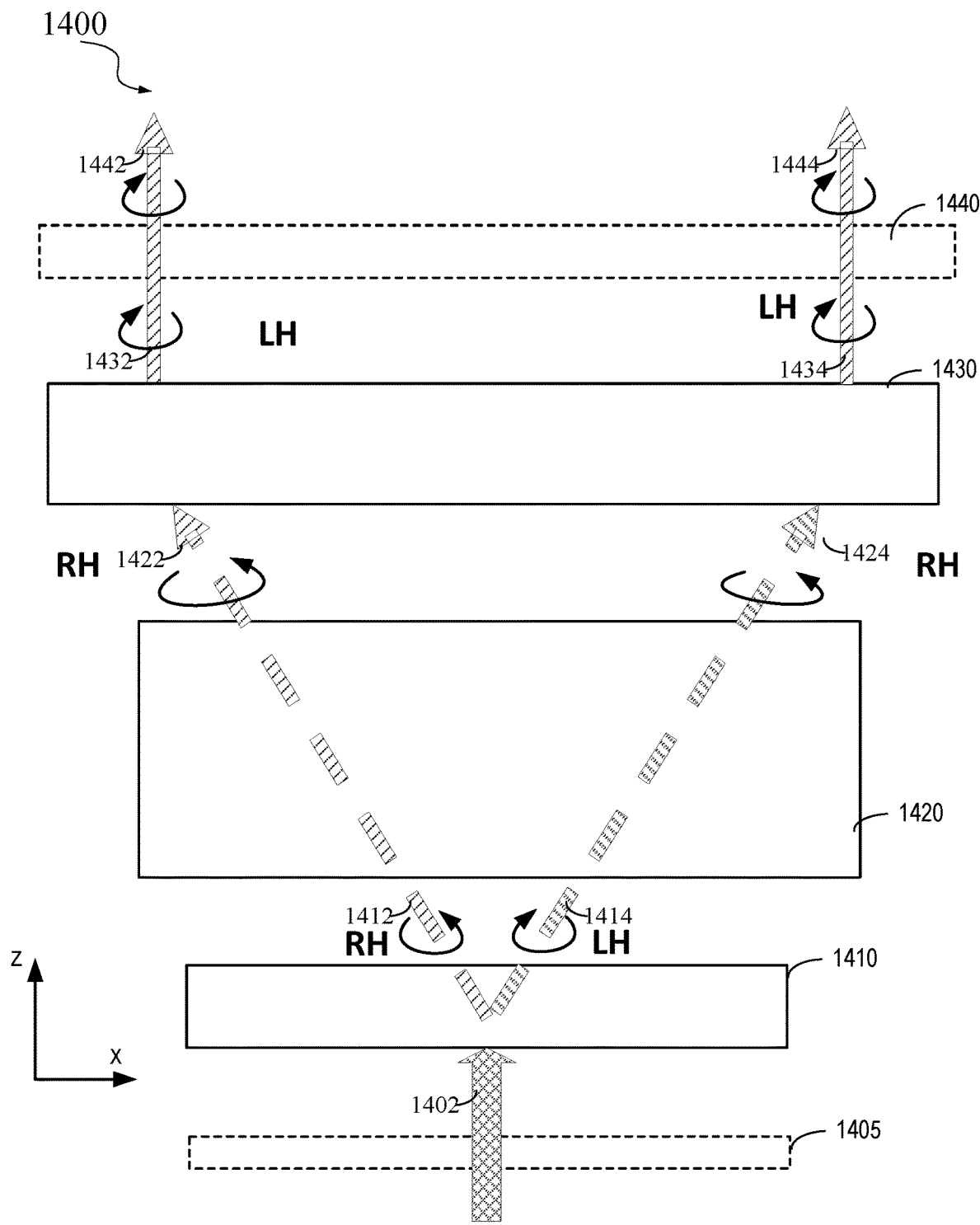
FIG. 14 illustrates an example of a polarization converter according to certain embodiments.

FIG. 14 illustrates an example of a polarization converter 1400 according to certain embodiments. Polarization converter 1400 may include a polarization-dependent grating 1410 (e.g., a geometric phase grating such as a PBP grating described above) and an angular selective waveplate 1420. Each of polarization-dependent grating 1410 and angular selective waveplate 1420 may include a liquid crystal layer having a thickness of a few microns or a few tens of microns (e.g., less than about 100, 50, 20, or 10 µm). In some embodiments, polarization-dependent grating 1410 and angular selective waveplate 1420 may be in physical contact to form a stack of thin layers. In some embodiments, polarization-dependent grating 1410 and angular selective waveplate 1420 may be spaced apart.

Polarization-dependent grating 1410 may be implemented using polarization-dependent grating 1000, or PBP grating 1100, 1200, or 202. Polarization-dependent grating 1410 may diffract an unpolarized (or partially polarized) incident beam 1402 into a first light beam 1412 that has a first polarization state (e.g., right-handed circular polarization) and propagates in a first direction, and a second light beam 1414 that has a second polarization state (e.g., left-handed circular polarization) and propagates in a second direction. Angular selective waveplate 1420 may function as a zero or full waveplate for first light beam 1412 propagating in the first direction and may also function as a half-wave plate for second light beam 1414 propagating in the second direction. Therefore, angular selective waveplate 1420 may maintain the first polarization state of first light beam 1412 (e.g., right-handed circularly polarized beam) propagating in the first direction, while changing the second polarization state of the second light beam 1414 (e.g., left-handed circularly polarized beam) propagating in the second direction to the first polarization state (e.g., right-handed circular polarization). As such, first light beam 1412 after passing through angular selective waveplate 1420 may become a light beam 1422 that has a same polarization state (e.g., right-handed circular polarization) as first light beam 1412. Second light beam 1414 after passing through angular selective waveplate 1420 may become a light beam 1424 that has a same polarization state (e.g., right-handed circular polarization) as light beam 1422. The pitch of polarization-dependent grating 1410 (e.g., PBP grating) may be selected based on the desired diffraction angles of first light beam 1412 and second light beam 1414, which may be selected based on the desired incident angles to achieve the zero (or full) waveplate and the half-wave plate, respectively.

In addition, polarization converter 1400 may include a second polarization-dependent grating 1430, such as a PBP grating. Second polarization-dependent grating 1430 may be in physical contact with angular selective waveplate 1420 or may be spaced apart from angular selective waveplate 1420. In some embodiments, second polarization-dependent grating 1430 may be a geometric phase lens or a polarization directed flat lens that has a spatially varying geometric phase in an x-y plane. For example, the geometric phase lens may include photo-aligned liquid crystal polymers formed by a holographic recording process using the wave-front of a lens. In the example illustrated in FIG. 14, second polarization-dependent grating 1430 (e.g., a geometric phase lens) may collimate light beams 1422 and 1424 and may also convert right-handed circularly polarized light beams 1422 and 1424 to left-handed circularly polarized light beams 1432 and 1434, respectively. In some other embodiments, a refractive lens or a Fresnel lens may be used to collimate light beams 1422 and 1424. In some embodiments, a quarter-wave plate (not shown in FIG. 14) may be used to convert the collimated circularly polarized light to linearly polarized light.

In some embodiments, light beam 1434 and/or light beam 1432 may not be fully circularly polarized, such as having an elliptical polarization state. Polarization converter 1400 may optionally include a circular polarizer 1440, such as a left-handed circular polarizer that allows left-handed circularly polarized light to pass through while blocking light of other polarization states. As such, light beam 1432 and light beam 1434 may become left-handed circularly polarized beams 1442 and 1444, respectively, after passing through circular polarizer 1440.

Optionally, in some embodiments, polarization converter 1400 may include a depolarizer 1405 that may convert an incident light beam into a randomly polarized light beam or a pseudo-randomly polarized light beam. The randomly polarized light beam or pseudo-randomly polarized light beam may be more evenly diffracted by polarization-dependent grating 1410 into first light beam 1412 that has the first polarization state (e.g., right-handed circular polarization) and propagates in the first direction, and second light beam 1414 that has a second polarization state (e.g., left-handed circular polarization) and propagates in the second direction.

Figure 15:
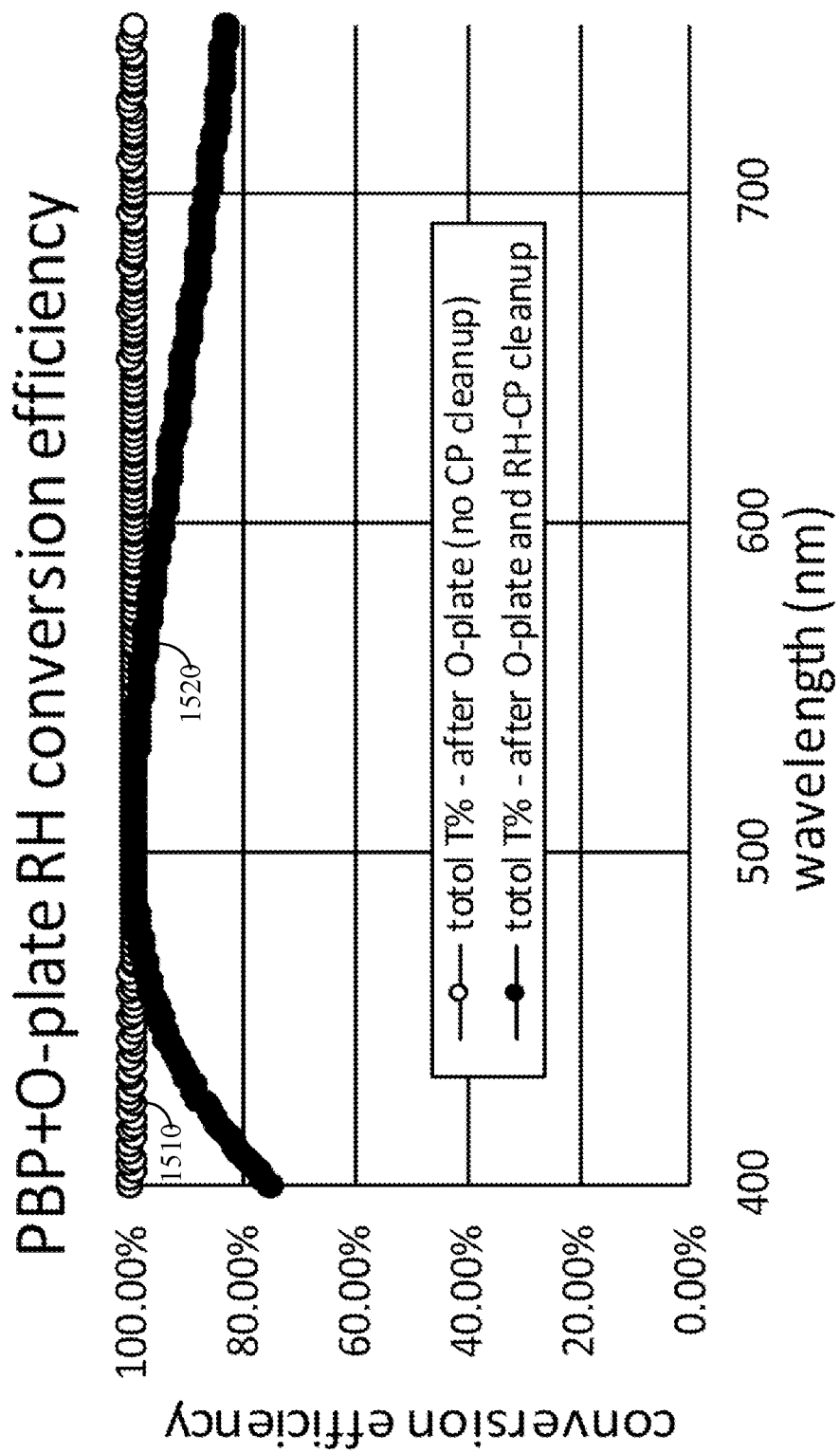
FIG. 15 illustrates the polarization conversion efficiency of an example of a polarization converter according to certain embodiments.

FIG. 15 illustrates the polarization conversion efficiency of an example of a polarization converter, such as polarization converter 900 or 1400, according to certain embodiments. In the illustrated example, a curve 1510 shows the conversion efficiency of polarization converter 900 for incident beam 902 after passing through polarization-dependent grating 910 and angular selective waveplate 920 (e.g., including an O-plate as shown in FIG. 13A). As illustrated, the conversion efficiency may be closed to 100% for incident light with a wavelength in the range of about 400 nm to over 700 nm. A curve 1520 shows the conversion efficiency of polarization converter 900 for incident beam 902 after passing through polarization-dependent grating 910, angular selective waveplate 920 (e.g., including an O-plate), and circular polarizer 930. As illustrated, the conversion efficiency may be closed to 100% for incident light with a wavelength around 500 nm and may be greater than about 80% for incident light with a wavelength in the range of about 420 nm to over 700 nm, where some light may be blocked by circular polarizer 930 because light beams 922 and/or 924 may be elliptically polarized rather than circularly polarized.

Figure 16:
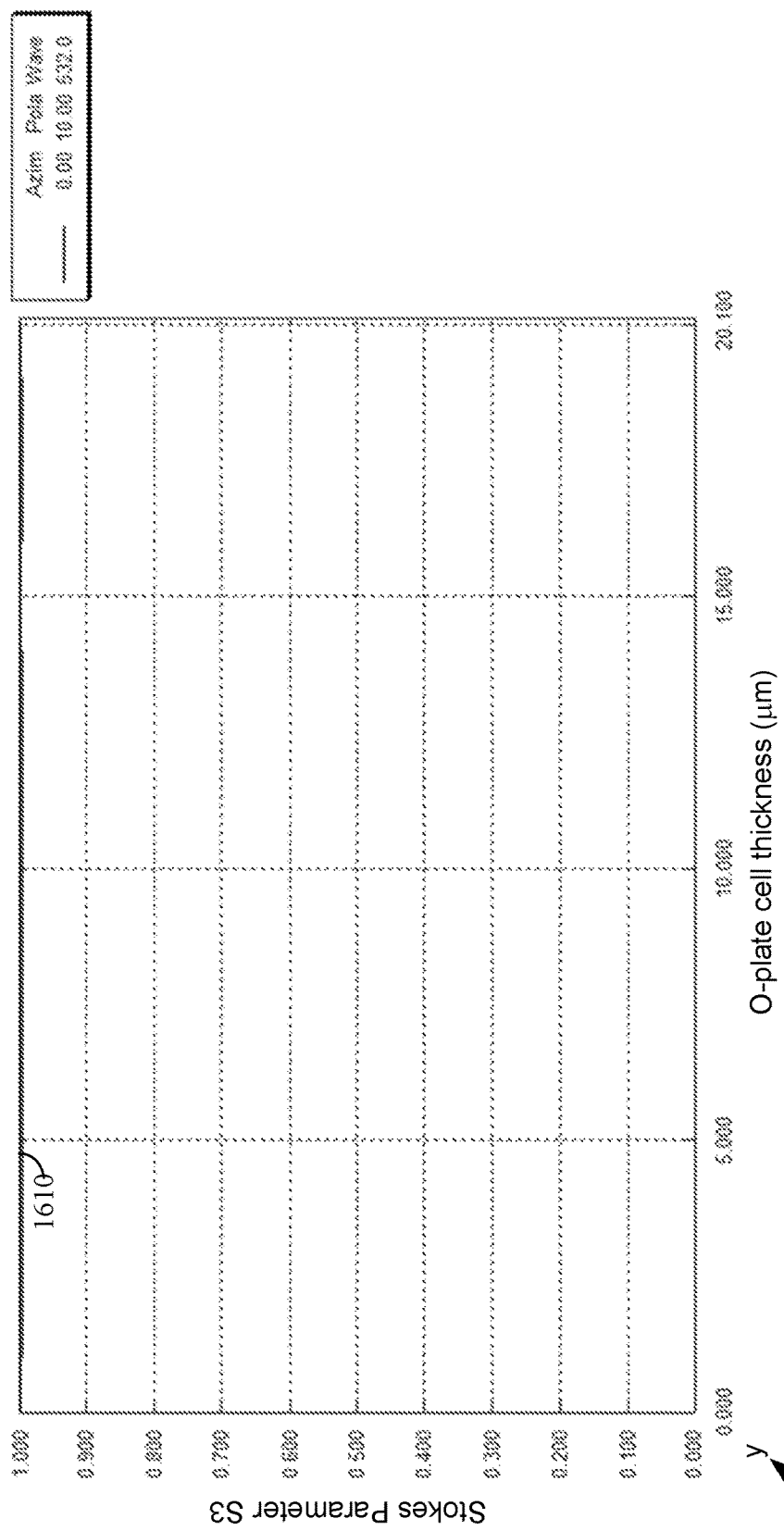
FIG. 16 illustrates Stokes parameters S3 of output light beams from examples of angular selective waveplates having different thicknesses for an incident light beam with a first incident angle according to certain embodiments.

FIG. 16 includes a curve 1610 illustrating Stokes parameters S3 of output light beams from examples of angular selective waveplates having different thicknesses (e.g., from about 0 µm to about 20 µm) for an incident light beam with a first incident angle according to certain embodiments. As described above, the Stokes parameter S3 describes the preponderance of the right-handed circularly polarized light over the left-handed circularly polarized light. For example, the Stokes parameter S3 for right-handed circularly polarized light may be +1, the Stokes parameter S3 for left-handed circularly polarized light may be −1, while the Stokes parameter S3 for linearly polarized light may be 0.

In the example shown in FIG. 16, the angular selective waveplates may be O-plates as shown in FIG. 13A, where the tilt angle of liquid crystal molecules 1302 may be about 80°. The azimuthal angle φ of the incident light beam is about 0°, and the polar angle θ of the incident light beam may be about 10°. The incident light beam may be right-handed circularly polarized. The wavelength of the incident light beam is about 532 nm (green light), and the pitch of the polarization-dependent grating is about 3 µm. FIG. 16 shows that, for a right-handed circularly polarized incident light beam with an azimuthal angle ϕ about 0° and a polar angle θ about 10°, the Stokes parameter S3 of the output light beam from an O-plate with a thickness between about 0 μm and about 20 μm is about +1 (i.e., right-handed circularly polarized).

Figure 17:
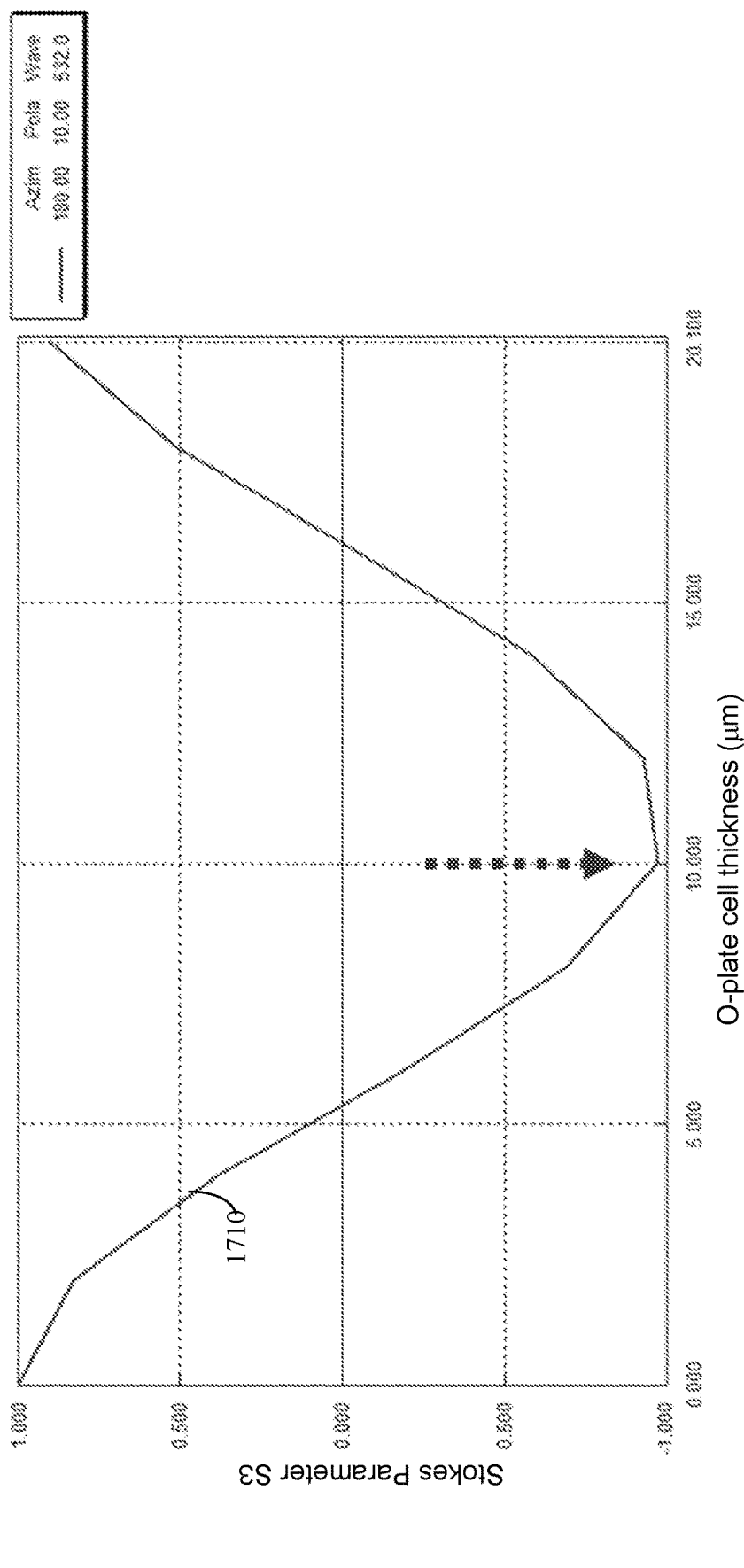
FIG. 17 illustrates Stokes parameters S3 of output light beams from examples of angular selective waveplates having different thicknesses for an incident light beam with a second incident angle according to certain embodiments.

FIG. 17 includes a curve 1710 illustrating Stokes parameters S3 of output light beams from examples of angular selective waveplates having different liquid crystal layer (e.g., O-plate) thicknesses (e.g., from about 0 μm to about 20 μm) for an incident light beam with a second incident angle according to certain embodiments. In the example shown in FIG. 17, the angular selective waveplates may be O-plates as shown in FIG. 13A, where the tilt angle of liquid crystal molecules 1302 may be about 80°. The azimuthal angle ϕ of the incident light beam is about 180°, and the polar angle θ of the incident light beam may be about 10°. The incident light beam may be right-handed circularly polarized. The wavelength of the incident light beam is about 532 nm. FIG. 17 shows that, for right-handed circularly polarized incident light with an azimuthal angle ϕ about 180° and a polar angle θ about 10°, the Stokes parameter S3 of the output light beam from an O-plate is about −1 (i.e., left-handed circularly polarized) when the thickness of the liquid crystal layer is about 10 μm.

Figure 18:
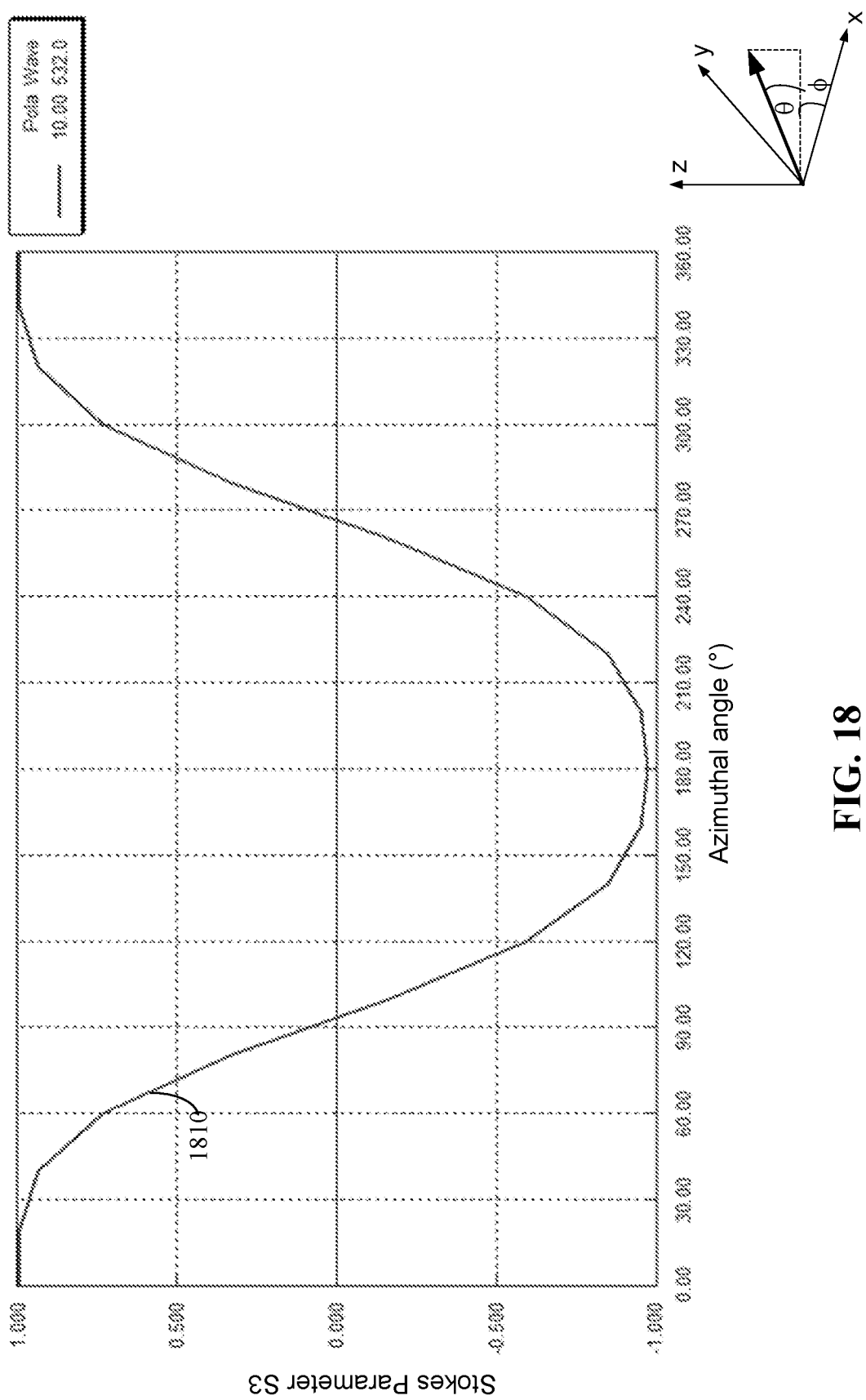
FIG. 18 illustrates Stokes parameters S3 of output light beams from an example of an angular selective waveplate for incident light beams with different azimuthal angles according to certain embodiments.

FIG. 18 includes a curve 1810 illustrating Stokes parameters S3 of output light beams from an example of an angular selective waveplate for incident light beams with different azimuthal angles (e.g., between about 0° and about 360°) according to certain embodiments. As with the examples shown in FIGS. 16 and 17, the angular selective waveplate in the example shown in FIG. 18 may be an O-plate as shown in FIG. 13A, where the tilt angle of liquid crystal molecules 1302 may be about 80°. The thickness of the liquid crystal layer in the O-plate is about 10 μm. The polar angle θ of the incident light beam may be about 10°. The incident light beam may be right-handed circularly polarized. The wavelength of the incident light beam is about 532 nm. A curve 1810 in FIG. 18 shows that, when the azimuthal angle of the incident light beam is about 0°, the output light beam from the angular selective waveplate may still be right-handed circularly polarized (with S3≈+1). However, when the azimuthal angle of the incident light beam is about 180°, the output light beam from the angular selective waveplate may become left-handed circularly polarized (with S3≈−1).

Figure 19:
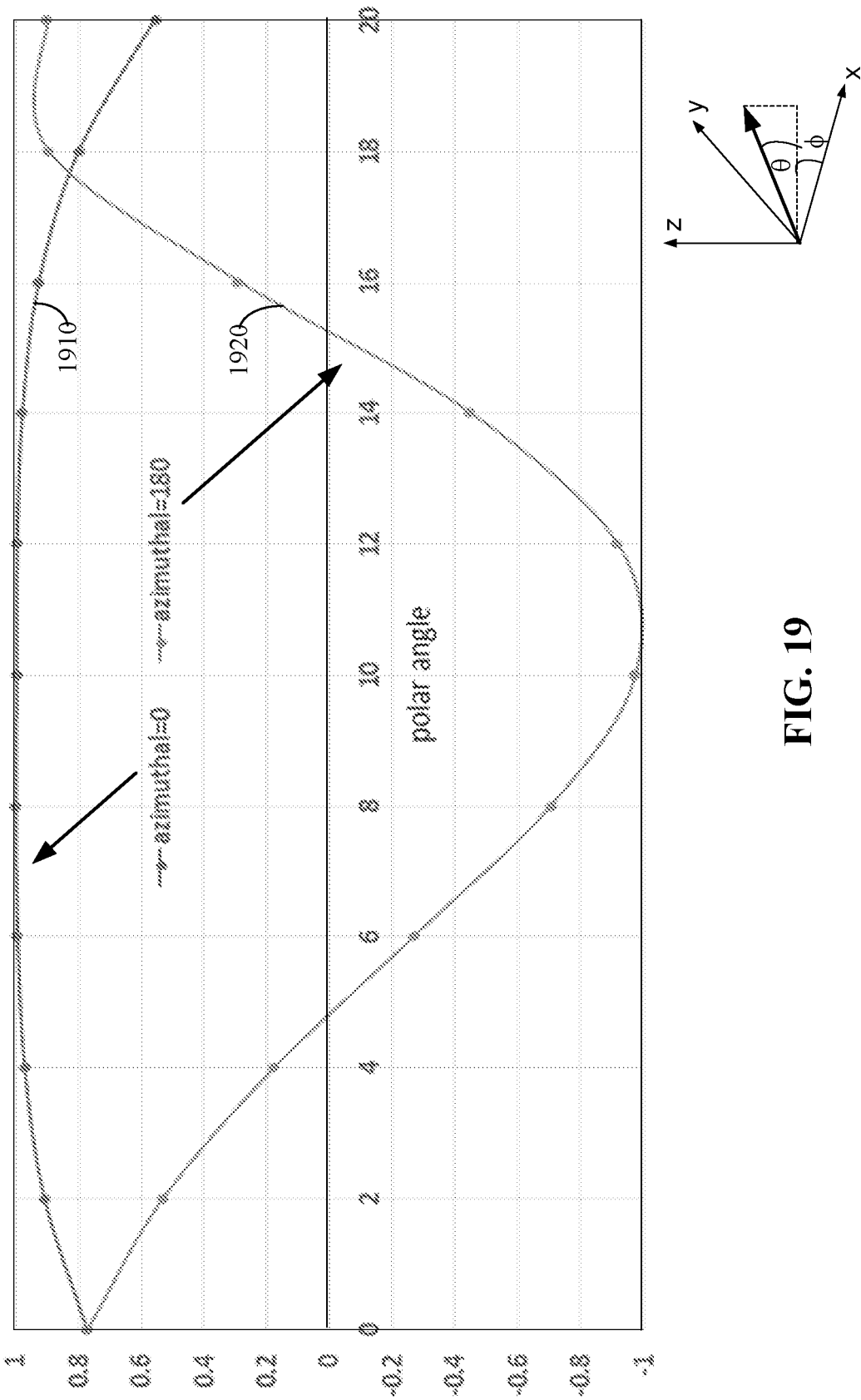
FIG. 19 illustrates Stokes parameters S3 of output light beams from an example of an angular selective waveplate for incident light beams with different polar angles and two different azimuthal angles (0° and 180°) according to certain embodiments.

FIG. 19 illustrates Stokes parameters S3 of output light beams from an example of an angular selective waveplate for incident light beams with different polar angles and two different azimuthal angles (0° and 180°) according to certain embodiments. As with the examples shown in FIGS. 16-18, the angular selective waveplate in the example shown in FIG. 19 may be an O-plate as shown in FIG. 13A, where the tilt angle of liquid crystal molecules 1302 may be about 80°. The thickness of the liquid crystal layer in the O-plate is about 10 μm. The incident light beam may be right-handed circularly polarized. The wavelength of the incident light beam is about 532 nm.

A curve 1910 in FIG. 19 shows the Stokes parameters S3 of output light beams from the angular selective waveplate for incident light with different polar angles (e.g., between about 0° and about 20°) and a same azimuthal angle about 0°. Curve 1910 shows that, when the azimuthal angle of the incident light beam is about 0°, the output light beams may be approximately right-handed circularly polarized even if the polar angle of the incident light beam varies from about 0° to about 20°.

A curve 1920 in FIG. 19 shows the Stokes parameters S3 of output light beams from the angular selective waveplate for incident light with different polar angles (e.g., between about 0° and about 20°) and a same azimuthal angle about 180°. Curve 1920 shows that, when the azimuthal angle of the incident light beam is about 180°, the Stokes parameter S3 of the output light beam may vary with the polar angle of the incident light beam. For example, when the polar angle is about 0° or about 20°, the Stokes parameter S3 of the output light beam may be about +1 (i.e., approximately right-handed circularly polarized). However, when the polar angle is within a range between about 9° and about 12°, the Stokes parameter S3 of the output light beam may be close to −1 (i.e., approximately left-handed circularly polarized).

Figure 20:
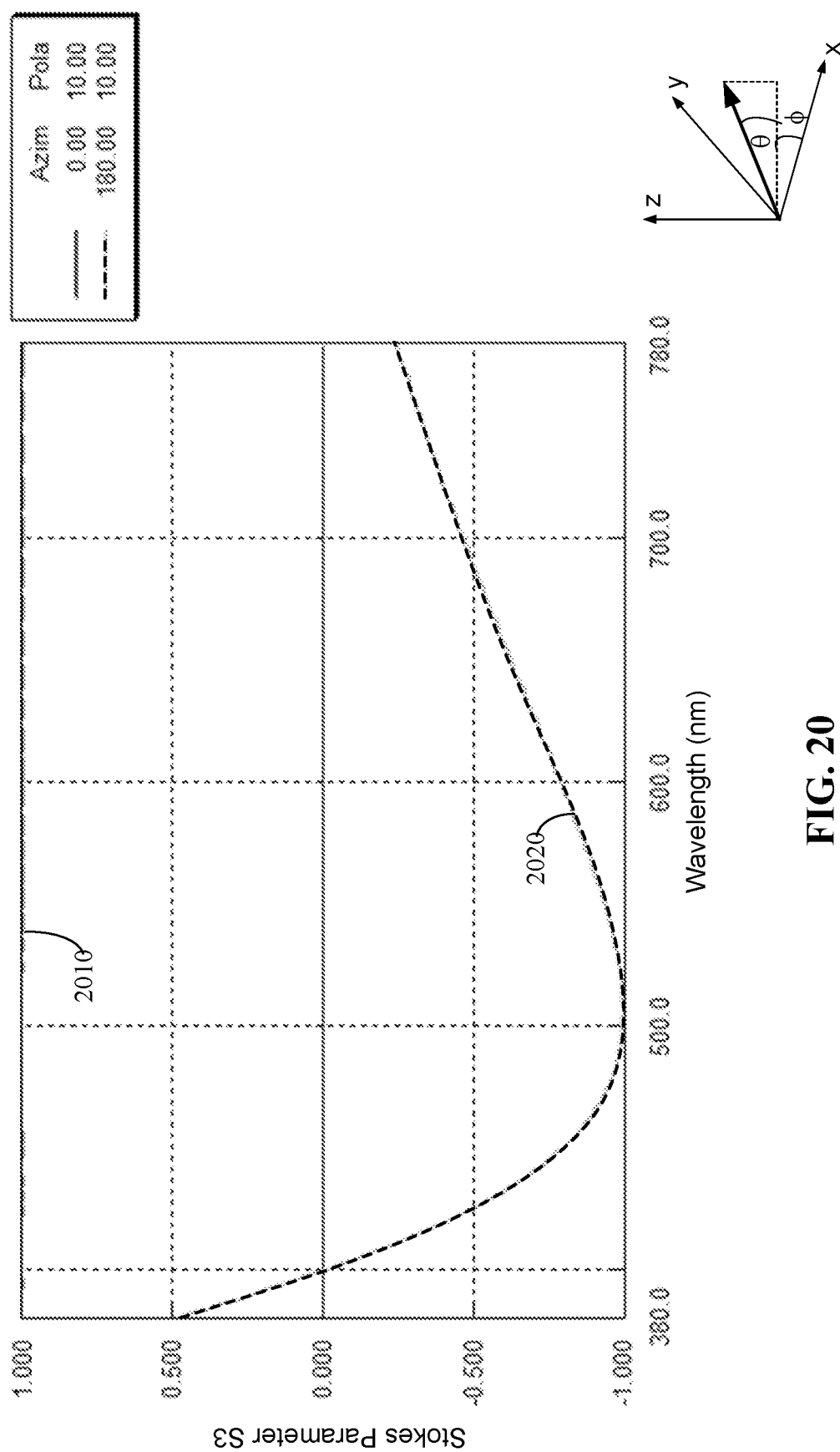
FIG. 20 illustrates Stokes parameters S3 of output light beams from an example of an angular selective waveplate for incident light beams of different wavelengths and two different azimuthal angles (0° and 180°) according to certain embodiments.

FIG. 20 illustrates Stokes parameters S3 of output light beams from an example of an angular selective waveplate for incident light beams of different wavelengths and two different azimuthal angles (0° and 180°) according to certain embodiments. As with the examples shown in FIGS. 16-19, the angular selective waveplate in the example shown in FIG. 20 may be an O-plate as shown in FIG. 13A, where the tilt angle of liquid crystal molecules 1302 may be about 80°. The thickness of the liquid crystal layer in the O-plate is about 10 μm. The incident light beam may be right-handed circularly polarized. The polar angle of the incident beam may be about 10°.

A curve 2010 in FIG. 20 shows the Stokes parameters S3 of output light beams from the angular selective waveplate for incident light beams of different wavelengths and with a polar angle about 10° and an azimuthal angle about 0°. Curve 2010 shows that, when the azimuthal angle of the incident light beam is about 0°, the output light beam may be approximately right-handed circularly polarized for incident light with a wavelength between about 380 nm and about 780 nm.

A curve 2020 in FIG. 20 shows the Stokes parameters S3 of output light beams from the angular selective waveplate for incident light beams of different wavelengths and with a polar angle about 10° and an azimuthal angle about 180°. Curve 2020 shows that, when the azimuthal angle of the incident beam is about 180°, the Stokes parameter S3 of the output light beam may vary with the wavelength of the incident light beam. For example, when the wavelength is around 500 nm, the Stokes parameter S3 of the output light beam may be about −1 (i.e., approximately left-handed circularly polarized).

Thus, FIGS. 16-20 show that, when the thickness of the liquid crystal layer of the angular selective waveplate (e.g., an O-plate) is about 10 μm, the O-plate may function as a full-wave plate for an incident green light beam (e.g., right-handed circularly polarized beam) with an azimuthal angle ϕ about 0° and a polar angle between about 0° and about 20°, and may also function as a half-wave plate for an incident green light beam (e.g., right-handed circularly polarized beam with a wavelength about 532 nm) with an azimuthal angle ϕ about 180° and a polar angle about 10°.

Figure 21:
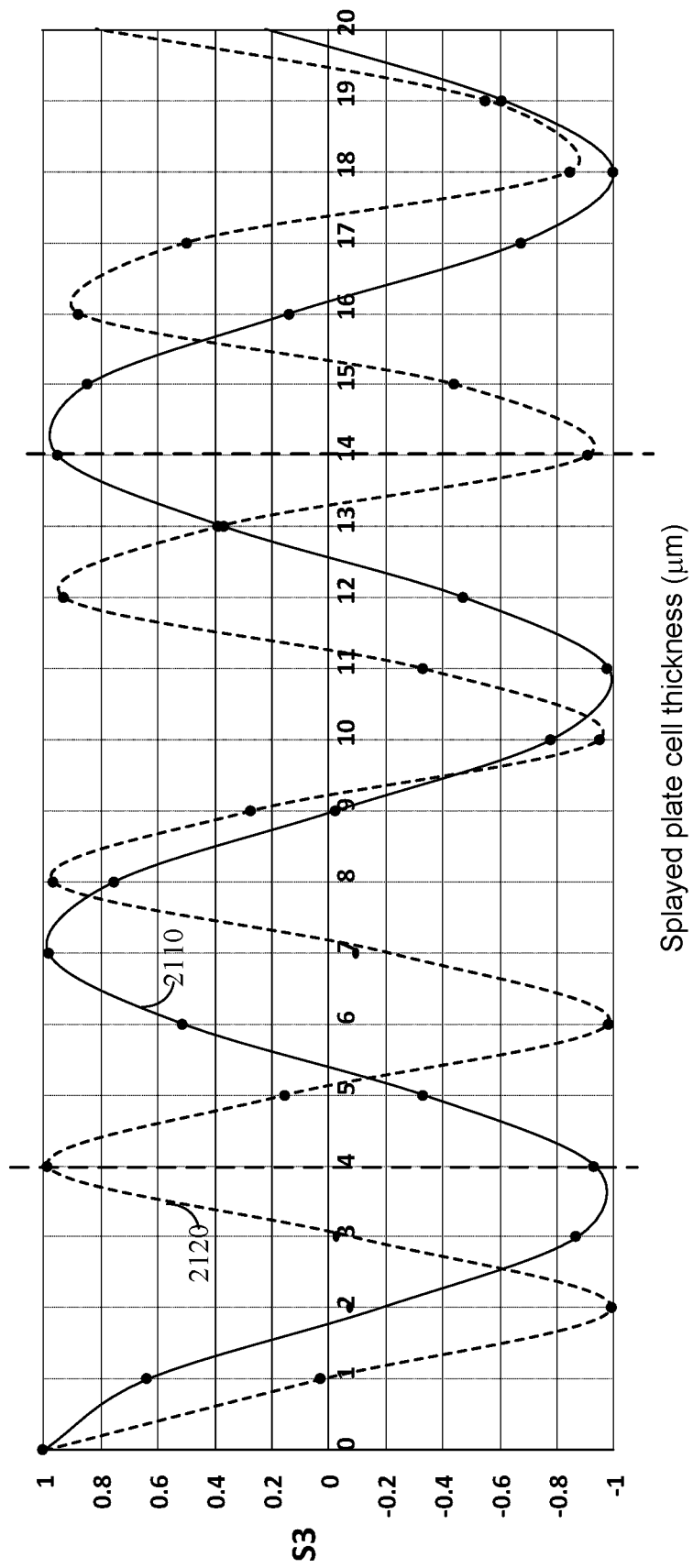
FIG. 21 illustrates Stokes parameters S3 of output light beams from examples of angular selective waveplates having different thicknesses for incident light beams with different incident angles according to certain embodiments.

FIG. 21 illustrates Stokes parameters S3 of output light beams from examples of angular selective waveplates (e.g., splayed plates) having different thicknesses (e.g., from about 0 μm to about 20 μm) for incident light beams with two different azimuthal angles according to certain embodiments. In the example shown in FIG. 21, the angular selective waveplates may be splayed plates including liquid crystal molecules aligned at different angles in different layers as shown in FIG. 13B. The orientation of the liquid crystal molecules in the splayed plates may change gradually from approximately horizonal (e.g., about 0°) to approximately vertical (e.g. about 90°) along the z direction. The polar angle θ of the incident light beam may be about 10°. The azimuthal angle φ of the incident light beam is about 0° or about 180°. The incident light beam may be right-handed circularly polarized. The wavelength of the incident light beam is about 532 nm.

A curve 2110 in FIG. 21 shows the Stokes parameters S3 of output light beams from the examples of angular selective waveplates having different thicknesses (e.g., from about 0 μm to about 20 μm) for incident right-handed circularly polarized light with a polar angle θ about 10° and an azimuthal angle φ about 0°. A curve 2120 in FIG. 21 shows the Stokes parameters S3 of output light beams from the examples of angular selective waveplates having different thicknesses (e.g., from about 0 μm to about 20 μm) for incident right-handed circularly polarized light with a polar angle θ about 10° and an azimuthal angle φ about 180°. Curve 2110 and curve 2120 show that the Stokes parameters S3 of the output light beams may vary with the thickness of the liquid crystal layer in the splayed plate. When the thickness of the liquid crystal layer in the splayed plate is about 4 μm, the Stokes parameter S3 of the output light beam may be about −1 (i.e., approximately left-handed circularly polarized) for an incident right-handed circularly polarized light beam with an azimuthal angle φ about 0°, whereas the Stokes parameter S3 of the output light beam may be about +1 (i.e., approximately right-handed circularly polarized) for an incident right-handed circularly polarized light beam with an azimuthal angle φ about 180°. When the thickness of the liquid crystal layer in the splayed plate is about 14 μm, the Stokes parameter S3 of the output light beam may be about −1 (i.e., approximately left-handed circularly polarized) for an incident right-handed circularly polarized light beam with an azimuthal angle φ about 180°, whereas the Stokes parameter S3 of the output light beam may be about +1 (i.e., approximately right-handed circularly polarized) for an incident right-handed circularly polarized light beam with an azimuthal angle φ about 0°.

Figure 22:
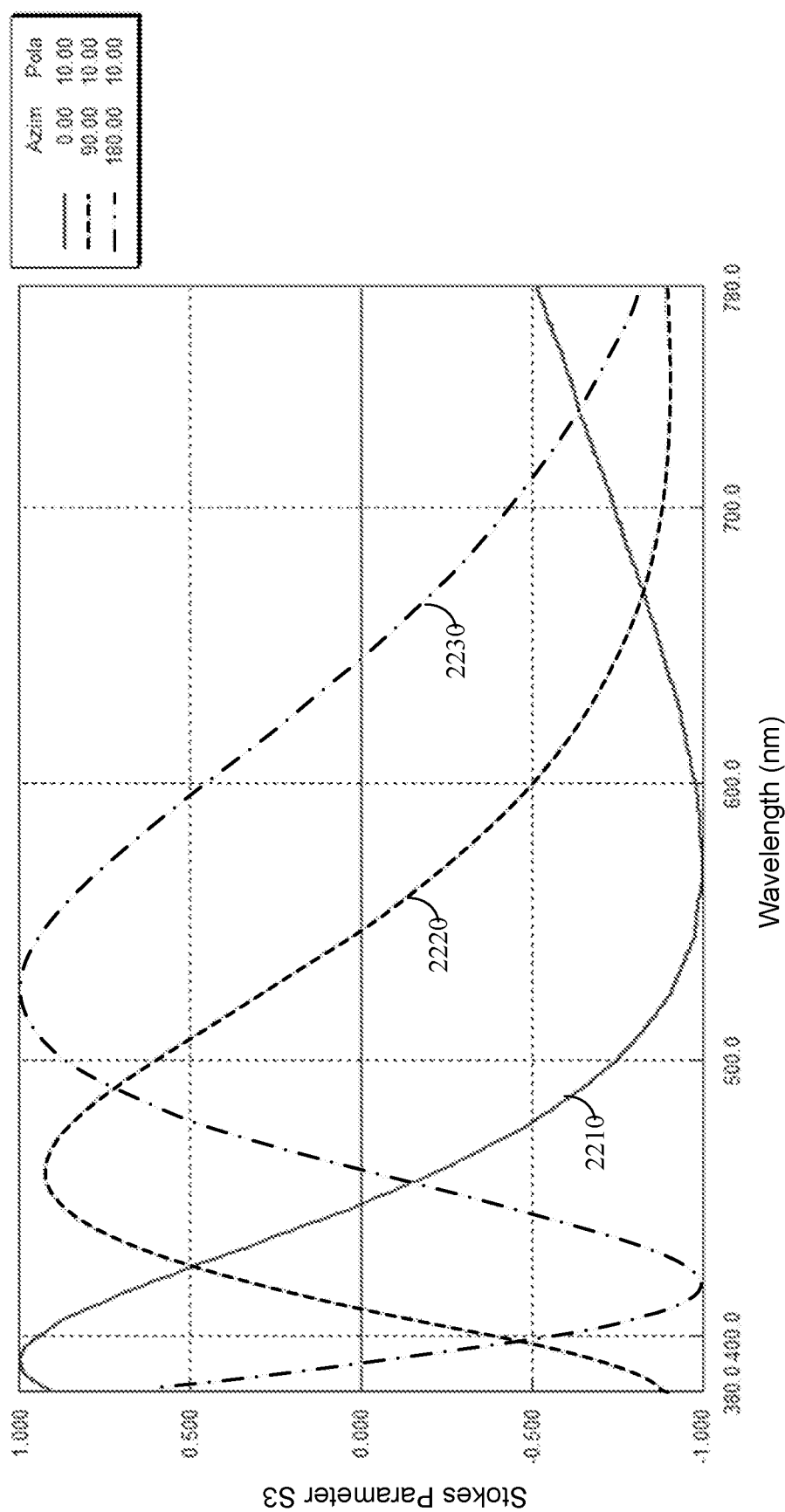
FIG. 22 illustrates Stokes parameters S3 of output light beams from an example of an angular selective waveplate for incident light beams having different wavelengths and different incident angles according to certain embodiments.

FIG. 22 illustrates Stokes parameters S3 of output light beams from an example of an angular selective waveplate for incident light beams with different wavelengths and different incident angles according to certain embodiments. The angular selective waveplate may be an example of the angular selective waveplates of FIG. 21, where the thickness of the liquid crystal layer in the angular selective waveplate (e.g., splayed plate) may be about 4 μm. The orientation of the liquid crystal molecules in the splayed plate may change gradually from approximately horizonal (e.g., about 8°) to approximately vertical (e.g. about 90°) along the z direction. The polar angle θ of the incident light beam may be about 10°. The azimuthal angle φ of the incident light beam is about 0°, about 90°, or about 180°. The incident light beam may be right-handed circularly polarized. The wavelength of the incident light beam may vary from about 380 nm to about 780 nm.

A curve 2210 in FIG. 22 shows the Stokes parameters S3 of output light beams from the angular selective waveplate for incident light beams of different wavelengths and with a polar angle θ about 10° and an azimuthal angle φ about 0°. A curve 2220 shows the Stokes parameters S3 of output light beams from the angular selective waveplate for incident light beams of different wavelengths and with a polar angle θ about 10° and an azimuthal angle φ about 90°. A curve 2230 shows the Stokes parameters S3 of output light beams from the angular selective waveplate for incident light beams of different wavelengths and with a polar angle θ about 10° and an azimuthal angle φ about 180°. Curves 2210-2230 show that the Stokes parameter S3 of the output light beam from the angular selective waveplate may vary with the wavelength and/or the azimuthal angle φ of the incident light beam.

Figure 23:
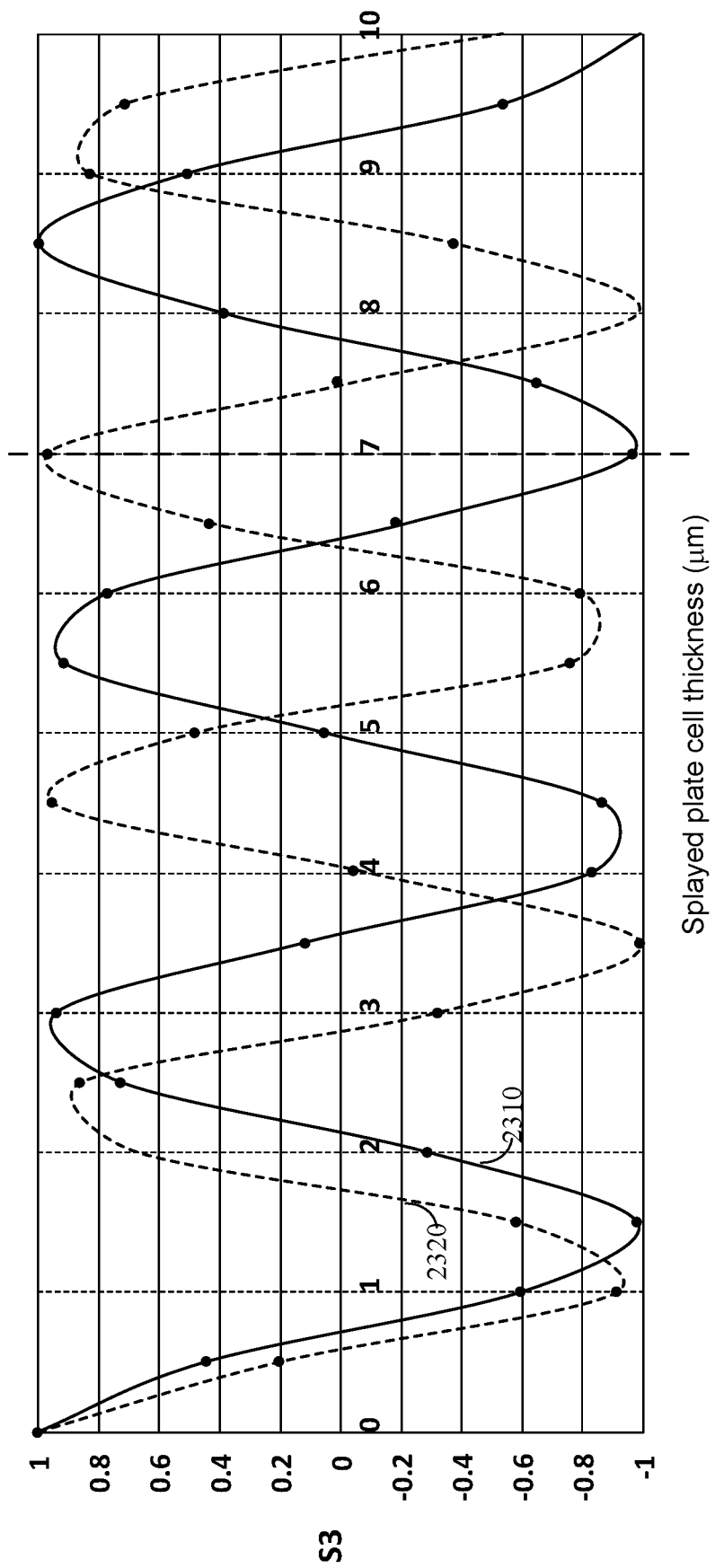
FIG. 23 illustrates Stokes parameters S3 of output light beams from examples of angular selective waveplates having different thicknesses for incident light beams with different incident angles according to certain embodiments.

FIG. 23 illustrates Stokes parameters S3 of output light beams from examples of angular selective waveplates having different thicknesses (e.g., from about 0 μm to about 10 μm) for incident light beams with two different azimuthal angles according to certain embodiments. In the example shown in FIG. 23, the angular selective waveplates may be splayed plates including liquid crystal molecules oriented at different angles in different layers as shown in FIG. 13C. The orientation of the liquid crystal molecules in the splayed plates may change gradually, for example, from about 30° to approximately horizontal (e.g., about 0°) along the z direction. The polar angle θ of the incident light beam may be about 10°. The azimuthal angle φ of the incident light beam is about 0° or about 180°. The incident light beam may be right-handed circularly polarized. The wavelength of the incident light beam is about 532 nm.

A curve 2310 in FIG. 23 shows the Stokes parameters S3 of output light beams from the examples of angular selective waveplates having different thicknesses (e.g., from about 0 μm to about 10 μm) for an incident right-handed circularly polarized light beam with a polar angle θ about 10° and an azimuthal angle φ about 0°. A curve 2320 in FIG. 23 shows the Stokes parameters S3 of output light beams from the examples of angular selective waveplates having different thicknesses (e.g., from about 0 μm to about 10 μm) for an incident right-handed circularly polarized light beam with a polar angle θ about 10° and an azimuthal angle φ about 180°. Curve 2310 and curve 2320 show that the Stokes parameters S3 of the output light beams may vary with the thickness of the liquid crystal layer in the splayed plate. When the thickness of the liquid crystal layer in the splayed plate is about 7 μm, the Stokes parameter S3 of the output light beam may be about −1 (i.e., approximately left-handed circularly polarized) for an incident right-handed circularly polarized light beam with an azimuthal angle φ about 0°, whereas the Stokes parameter S3 of the output light beam may be about +1 (i.e., approximately right-handed circularly polarized) for an incident right-handed circularly polarized light beam with an azimuthal angle φ about 180°.

Figure 24:
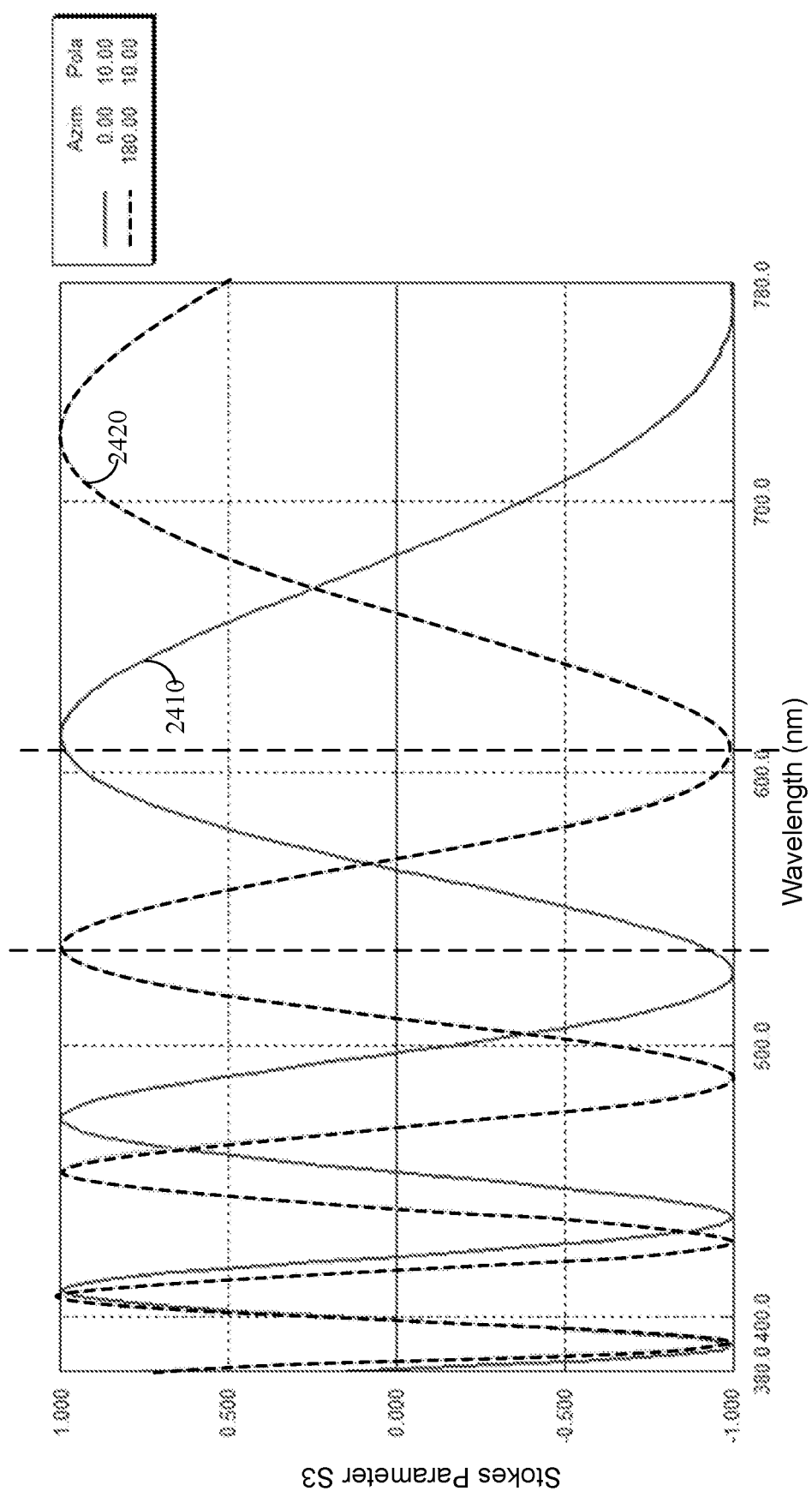
FIG. 24 illustrates Stokes parameters S3 of an example of an angular selective waveplate for incident light beams with different wavelengths and different incident angles according to certain embodiments.

FIG. 24 illustrates Stokes parameters S3 of output light beams from an example of an angular selective waveplate for incident light beams with different wavelengths and different incident angles according to certain embodiments. The angular selective waveplate may be an example of the angular selective waveplates of FIG. 23, where the thickness of the liquid crystal layer in the angular selective waveplate (e.g., splayed plate) may be about 7 μm. The orientation of the liquid crystal molecules in the splayed plates may change gradually, for example, from about 30° to approximately horizontal (e.g., about 0°) along the z direction. The polar angle θ of the incident light beam may be about 10°. The azimuthal angle φ of the incident light beam is about 0° or about 180°. The incident light beam may be right-handed circularly polarized. The wavelength of the incident light beam may vary from about 380 nm to about 780 nm.

A curve 2410 in FIG. 24 shows the Stokes parameters S3 of output light beams from the angular selective waveplate for incident right-handed circularly polarized light beams of different wavelengths and with a polar angle θ about 10° and an azimuthal angle φ about 0°. A curve 2420 in FIG. 24 shows the Stokes parameters S3 of output light beams from the angular selective waveplate for incident right-handed circularly polarized light beams of different wavelengths and with a polar angle θ about 10° and an azimuthal angle φ about 180°. Curves 2410 and 2420 show that the Stokes parameter S3 of the output light beam may vary with the wavelength and/or the azimuthal angle of the incident light beam.

Embodiments disclosed herein may be used to implement components of an artificial reality system or may be implemented in conjunction with an artificial reality system. Artificial reality is a form of reality that has been adjusted in some manner before presentation to a user, which may include, for example, a virtual reality, an augmented reality, a mixed reality, a hybrid reality, or some combination and/or derivatives thereof. Artificial reality content may include completely generated content or generated content combined with captured (e.g., real-world) content. The artificial reality content may include video, audio, haptic feedback, or some combination thereof, and any of which may be presented in a single channel or in multiple channels (such as stereo video that produces a three-dimensional effect to the viewer). Additionally, in some embodiments, artificial reality may also be associated with applications, products, accessories, services, or some combination thereof, that are used to, for example, create content in an artificial reality and/or are otherwise used in (e.g., perform activities in) an artificial reality. The artificial reality system that provides the artificial reality content may be implemented on various platforms, including an HMD connected to a host computer system, a standalone HMD, a mobile device or computing system, or any other hardware platform capable of providing artificial reality content to one or more viewers.

Figure 25:
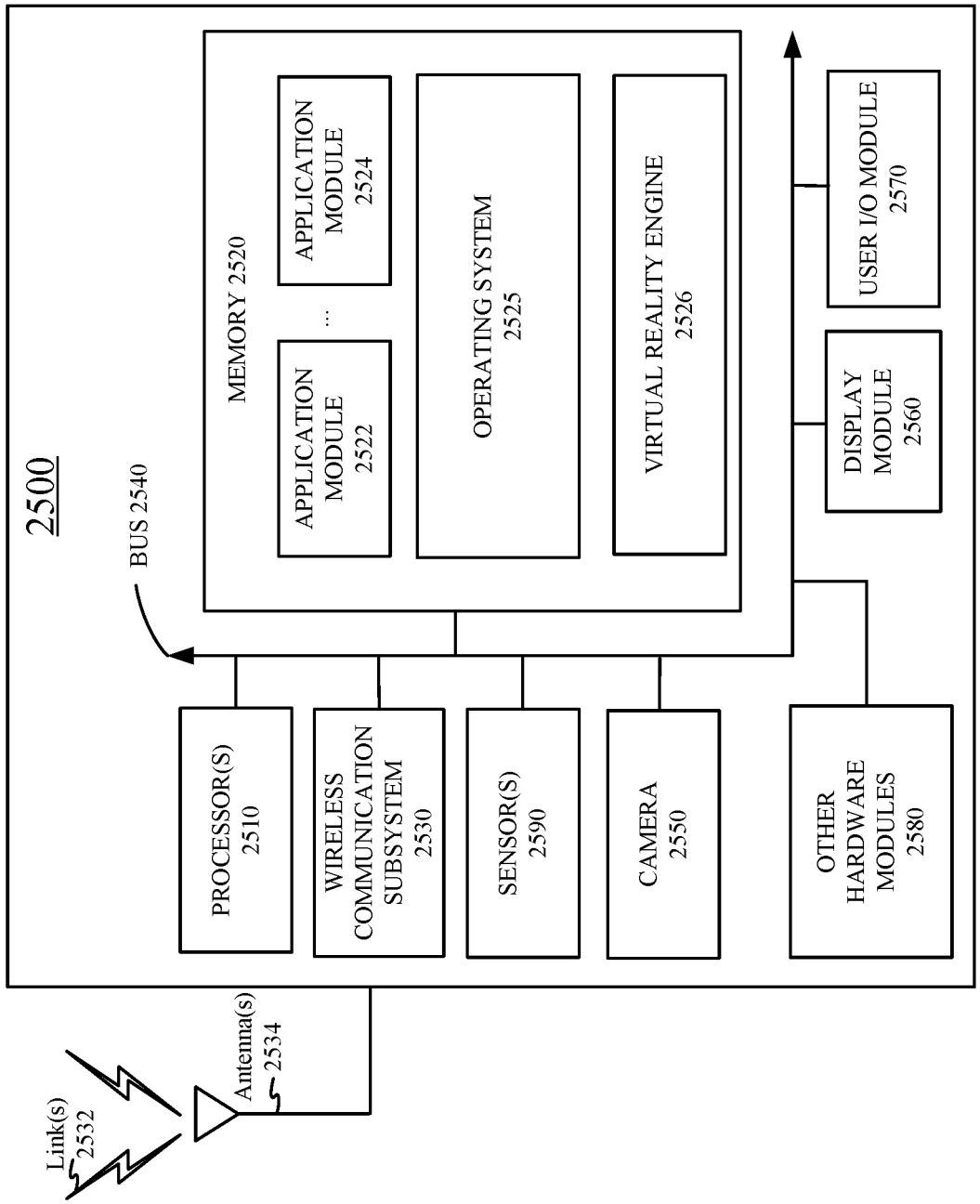
FIG. 25 is a simplified block diagram of an example of an electronic system of a near-eye display for implementing some of the examples disclosed herein.

FIG. 25 is a simplified block diagram of an example electronic system 2500 of an example near-eye display (e.g., HMD device) for implementing some of the examples disclosed herein. Electronic system 2500 may be used as the electronic system of an HMD device or other near-eye displays described above. In this example, electronic system 2500 may include one or more processor(s) 2510 and a memory 2520. Processor(s) 2510 may be configured to execute instructions for performing operations at multiple components, and can be, for example, a general-purpose processor or microprocessor suitable for implementation within a portable electronic device. Processor(s) 2510 may be communicatively coupled with a plurality of components within electronic system 2500. To realize this communicative coupling, processor(s) 2510 may communicate with the other illustrated components across a bus 2540. Bus 2540 may be any subsystem adapted to transfer data within electronic system 2500. Bus 2540 may include a plurality of computer buses and additional circuitry to transfer data.

Memory 2520 may be coupled to processor(s) 2510. In some embodiments, memory 2520 may offer both short-term and long-term storage and may be divided into several units. Memory 2520 may be volatile, such as static random-access memory (SRAM) and/or DRAM and/or non-volatile, such as read-only memory (ROM), flash memory, and the like. Furthermore, memory 2520 may include removable storage devices, such as secure digital (SD) cards. Memory 2520 may provide storage of computer-readable instructions, data structures, program modules, and other data for electronic system 2500. In some embodiments, memory 2520 may be distributed into different hardware modules. A set of instructions and/or code might be stored on memory 2520. The instructions might take the form of executable code that may be executable by electronic system 2500, and/or might take the form of source and/or installable code, which, upon compilation and/or installation on electronic system 2500 (e.g., using any of a variety of generally available compilers, installation programs, compression/decompression utilities, etc.), may take the form of executable code.

In some embodiments, memory 2520 may store a plurality of application modules 2522 through 2524, which may include any number of applications. Examples of applications may include gaming applications, conferencing applications, video playback applications, or other suitable applications. The applications may include a depth sensing function or eye tracking function. Application modules 2522-2524 may include instructions to be executed by processor(s) 2510. In some embodiments, certain applications or parts of application modules 2522-2524 may be executable by other hardware modules 2580. In certain embodiments, memory 2520 may additionally include secure memory, which may include additional security controls to prevent copying or other unauthorized access to secure information.

In some embodiments, memory 2520 may include an operating system 2525 loaded therein. Operating system 2525 may be operable to initiate the execution of the instructions provided by application modules 2522-2524 and/or manage other hardware modules 2580 as well as interfaces with a wireless communication subsystem 2530 which may include one or more wireless transceivers. Operating system 2525 may be adapted to perform other operations across the components of electronic system 2500 including threading, resource management, data storage control and other similar functionality.

Wireless communication subsystem 2530 may include, for example, an infrared communication device, a wireless communication device and/or chipset (such as a Bluetooth® device, an IEEE 802.11 device, a Wi-Fi device, a WiMAX device, cellular communication facilities, etc.), and/or similar communication interfaces. Electronic system 2500 may include one or more antennas 2534 for wireless communication as part of wireless communication subsystem 2530 or as a separate component coupled to any portion of the system. Depending on desired functionality, wireless communication subsystem 2530 may include separate transceivers to communicate with base transceiver stations and other wireless devices and access points, which may include communicating with different data networks and/or network types, such as wireless wide-area networks (WWANs), wireless local area networks (WLANs), or wireless personal area networks (WPANs). A WWAN may be, for example, a WiMAX (IEEE 802.16) network. A WLAN may be, for example, an IEEE 802.11x network. A WPAN may be, for example, a Bluetooth network, an IEEE 802.15x, or some other types of network. The techniques described herein may also be used for any combination of WWAN, WLAN, and/or WPAN. Wireless communications subsystem 2530 may permit data to be exchanged with a network, other computer systems, and/or any other devices described herein. Wireless communication subsystem 2530 may include a means for transmitting or receiving data, such as identifiers of HMD devices, position data, a geographic map, a heat map, photos, or videos, using antenna(s) 2534 and wireless link(s) 2532. Wireless communication subsystem 2530, processor(s) 2510, and memory 2520 may together comprise at least a part of one or more of a means for performing some functions disclosed herein.

Embodiments of electronic system 2500 may also include one or more sensors 2590. Sensor(s) 2590 may include, for example, an image sensor, an accelerometer, a pressure sensor, a temperature sensor, a proximity sensor, a magnetometer, a gyroscope, an inertial sensor (e.g., a module that combines an accelerometer and a gyroscope), an ambient light sensor, or any other similar module operable to provide sensory output and/or receive sensory input, such as a depth sensor or a position sensor. For example, in some implementations, sensor(s) 2590 may include one or more inertial measurement units (IMUs) and/or one or more position sensors. An IMU may generate calibration data indicating an estimated position of the HMD device relative to an initial position of the HMD device, based on measurement signals received from one or more of the position sensors. A position sensor may generate one or more measurement signals in response to motion of the HMD device. Examples of the position sensors may include, but are not limited to, one or more accelerometers, one or more gyroscopes, one or more magnetometers, another suitable type of sensor that detects motion, a type of sensor used for error correction of the IMU, or some combination thereof. The position sensors may be located external to the IMU, internal to the IMU, or some combination thereof. At least some sensors may use a structured light pattern for sensing.

Electronic system 2500 may include a display module 2560. Display module 2560 may be a near-eye display, and may graphically present information, such as images, videos, and various instructions, from electronic system 2500 to a user. Such information may be derived from one or more application modules 2522-2524, virtual reality engine 2526, one or more other hardware modules 2580, a combination thereof, or any other suitable means for resolving graphical content for the user (e.g., by operating system 2525). Display module 2560 may use liquid crystal display (LCD) technology, LED technology (including, for example, OLED, ILED, μLED, AMOLED, TOLED, etc.), light emitting polymer display (LPD) technology, or some other display technology.

Electronic system 2500 may include a user input/output module 2570. User input/output module 2570 may allow a user to send action requests to electronic system 2500. An action request may be a request to perform a particular action. For example, an action request may be to start or end an application or to perform a particular action within the application. User input/output module 2570 may include one or more input devices. Example input devices may include a touchscreen, a touch pad, microphone(s), button(s), dial(s), switch(es), a keyboard, a mouse, a game controller, or any other suitable device for receiving action requests and communicating the received action requests to electronic system 2500. In some embodiments, user input/output module 2570 may provide haptic feedback to the user in accordance with instructions received from electronic system 2500. For example, the haptic feedback may be provided when an action request is received or has been performed.

Electronic system 2500 may include a camera 2550 that may be used to take photos or videos of a user, for example, for tracking the user's eye position. Camera 2550 may also be used to take photos or videos of the environment, for example, for VR, AR, or MR applications. Camera 2550 may include, for example, a complementary metal-oxide-semiconductor (CMOS) image sensor with a few millions or tens of millions of pixels. In some implementations, camera 2550 may include two or more cameras that may be used to capture 3D images.

In some embodiments, electronic system 2500 may include a plurality of other hardware modules 2580. Each of other hardware modules 2580 may be a physical module within electronic system 2500. While each of other hardware modules 2580 may be permanently configured as a structure, some of other hardware modules 2580 may be temporarily configured to perform specific functions or temporarily activated. Examples of other hardware modules 2580 may include, for example, an audio output and/or input module (e.g., a microphone or speaker), a near field communication (NFC) module, a rechargeable battery, a battery management system, a wired/wireless battery charging system, etc. In some embodiments, one or more functions of other hardware modules 2580 may be implemented in software.

In some embodiments, memory 2520 of electronic system 2500 may also store a virtual reality engine 2526. Virtual reality engine 2526 may execute applications within electronic system 2500 and receive position information, acceleration information, velocity information, predicted future positions, or some combination thereof of the HMD device from the various sensors. In some embodiments, the information received by virtual reality engine 2526 may be used for producing a signal (e.g., display instructions) to display module 2560. For example, if the received information indicates that the user has looked to the left, virtual reality engine 2526 may generate content for the HMD device that mirrors the user's movement in a virtual environment. Additionally, virtual reality engine 2526 may perform an action within an application in response to an action request received from user input/output module 2570 and provide feedback to the user. The provided feedback may be visual, audible, or haptic feedback. In some implementations, processor(s) 2510 may include one or more graphic processing units (GPUs) that may execute virtual reality engine 2526.

In various implementations, the above-described hardware and modules may be implemented on a single device or on multiple devices that can communicate with one another using wired or wireless connections. For example, in some implementations, some components or modules, such as GPUs, virtual reality engine 2526, and applications (e.g., tracking application), may be implemented on a console separate from the head-mounted display device. In some implementations, one console may be connected to or support more than one HMD.

In alternative configurations, different and/or additional components may be included in electronic system 2500. Similarly, functionality of one or more of the components can be distributed among the components in a manner different from the manner described above. For example, in some embodiments, electronic system 2500 may be modified to include other system environments, such as an AR system environment and/or an MR environment.

The methods, systems, and devices discussed above are examples. Various embodiments may omit, substitute, or add various procedures or components as appropriate. For instance, in alternative configurations, the methods described may be performed in an order different from that described, and/or various stages may be added, omitted, and/or combined. Also, features described with respect to certain embodiments may be combined in various other embodiments. Different aspects and elements of the embodiments may be combined in a similar manner. Also, technology evolves and, thus, many of the elements are examples that do not limit the scope of the disclosure to those specific examples.

Specific details are given in the description to provide a thorough understanding of the embodiments. However, embodiments may be practiced without these specific details. For example, well-known circuits, processes, systems, structures, and techniques have been shown without unnecessary detail in order to avoid obscuring the embodiments. This description provides example embodiments only, and is not intended to limit the scope, applicability, or configuration of the invention. Rather, the preceding description of the embodiments will provide those skilled in the art with an enabling description for implementing various embodiments. Various changes may be made in the function and arrangement of elements without departing from the spirit and scope of the present disclosure.

Also, some embodiments were described as processes depicted as flow diagrams or block diagrams. Although each may describe the operations as a sequential process, many of the operations may be performed in parallel or concurrently. In addition, the order of the operations may be rearranged. A process may have additional steps not included in the figure. Furthermore, embodiments of the methods may be implemented by hardware, software, firmware, middleware, microcode, hardware description languages, or any combination thereof. When implemented in software, firmware, middleware, or microcode, the program code or code segments to perform the associated tasks may be stored in a computer-readable medium such as a storage medium. Processors may perform the associated tasks.

It will be apparent to those skilled in the art that substantial variations may be made in accordance with specific requirements. For example, customized or special-purpose hardware might also be used, and/or particular elements might be implemented in hardware, software (including portable software, such as applets, etc.), or both. Further, connection to other computing devices such as network input/output devices may be employed.

With reference to the appended figures, components that can include memory can include non-transitory machine-readable media. The term "machine-readable medium" and "computer-readable medium," as used herein, refer to any storage medium that participates in providing data that causes a machine to operate in a specific fashion. In embodiments provided hereinabove, various machine-readable media might be involved in providing instructions/code to processing units and/or other device(s) for execution. Additionally or alternatively, the machine-readable media might be used to store and/or carry such instructions/code. In many implementations, a computer-readable medium is a physical and/or tangible storage medium. Such a medium may take many forms, including, but not limited to, non-volatile media, volatile media, and transmission media. Common forms of computer-readable media include, for example, magnetic and/or optical media such as compact disk (CD) or digital versatile disk (DVD), punch cards, paper tape, any other physical medium with patterns of holes, a RAM, a programmable read-only memory (PROM), an erasable programmable read-only memory (EPROM), a Flash-EPROM, any other memory chip or cartridge, a carrier wave as described hereinafter, or any other medium from which a computer can read instructions and/or code. A computer program product may include code and/or machine-executable instructions that may represent a procedure, a function, a subprogram, a program, a routine, an application (App), a subroutine, a module, a software package, a class, or any combination of instructions, data structures, or program statements.

Those of skill in the art will appreciate that information and signals used to communicate the messages described herein may be represented using any of a variety of different technologies and techniques. For example, data, instructions, commands, information, signals, bits, symbols, and chips that may be referenced throughout the above description may be represented by voltages, currents, electromagnetic waves, magnetic fields or particles, optical fields or particles, or any combination thereof.

Terms, "and" and "or" as used herein, may include a variety of meanings that are also expected to depend at least in part upon the context in which such terms are used. Typically, "or" if used to associate a list, such as A, B, or C, is intended to mean A, B, and C, here used in the inclusive sense, as well as A, B, or C, here used in the exclusive sense. In addition, the term "one or more" as used herein may be used to describe any feature, structure, or characteristic in the singular or may be used to describe some combination of features, structures, or characteristics. However, it should be noted that this is merely an illustrative example and claimed subject matter is not limited to this example. Furthermore, the term "at least one of" if used to associate a list, such as A, B, or C, can be interpreted to mean A, B, C, or any combination of A, B, and/or C, such as AB, AC, BC, AA, BB, ABC, AAB, ACC, AABBCCC, etc.

Further, while certain embodiments have been described using a particular combination of hardware and software, it should be recognized that other combinations of hardware and software are also possible. Certain embodiments may be implemented only in hardware, or only in software, or using combinations thereof. In one example, software may be implemented with a computer program product containing computer program code or instructions executable by one or more processors for performing any or all of the steps, operations, or processes described in this disclosure, where the computer program may be stored on a non-transitory computer readable medium. The various processes described herein can be implemented on the same processor or different processors in any combination.

Where devices, systems, components or modules are described as being configured to perform certain operations or functions, such configuration can be accomplished, for example, by designing electronic circuits to perform the operation, by programming programmable electronic circuits (such as microprocessors) to perform the operation such as by executing computer instructions or code, or processors or cores programmed to execute code or instructions stored on a non-transitory memory medium, or any combination thereof. Processes can communicate using a variety of techniques, including, but not limited to, conventional techniques for inter-process communications, and different pairs of processes may use different techniques, or the same pair of processes may use different techniques at different times.

The specification and drawings are, accordingly, to be regarded in an illustrative rather than a restrictive sense. It will, however, be evident that additions, subtractions, deletions, and other modifications and changes may be made thereunto without departing from the broader spirit and scope as set forth in the claims. Thus, although specific embodiments have been described, these are not intended to be limiting. Various modifications and equivalents are within the scope of the following claims.

What is claimed is:
1. A device comprising:
   a geometric phase grating including a first liquid crystal layer and configured to diffract an incident light beam into a first light beam and a second light beam, wherein:
      the first light beam is characterized by a first polarization state and propagates in a first direction; and
      the second light beam is characterized by a second polarization state and propagates in a second direction different from the first direction; and an angular selective waveplate including a second liquid crystal layer, wherein the angular selective waveplate is:
a zero or full-wave plate for the first light beam incident in the first direction; and
a half-wave plate for the second light beam incident in the second direction.

2. The device of claim 1, wherein the geometric phase grating includes a Pancharatnam-Berry phase (PBP) grating.

3. The device of claim 2, wherein the PBP grating is characterized by a birefringence of a half wavelength of the incident light beam.

4. The device of claim 1, wherein:
the first polarization state is a left-handed circular polarization, and the second polarization state is a right-handed circular polarization; or
the first polarization state is a right-handed circular polarization, and the second polarization state is a left-handed circular polarization.

5. The device of claim 1, wherein the angular selective waveplate includes:
a homogeneous oblique plate including liquid crystal molecules tilted uniformly at an oblique angle; or
a splayed plate including liquid crystal molecules aligned at different respective angles in different layers.

6. The device of claim 1, further comprising a polarizer after the angular selective waveplate, the polarizer configured to transmit light in the first polarization state and block light in the second polarization state.

7. The device of claim 1, further comprising a second geometric phase grating after the angular selective waveplate, the second geometric phase grating configured to change polarization states of the first light beam and the second light beam after the first light beam and the second light beam pass through the angular selective waveplate.

8. The device of claim 7, wherein the second geometric phase grating includes a geometric phase lens configured to collimate the first light beam and the second light beam after the first light beam and the second light beam pass through the angular selective waveplate.

9. The device of claim 7, further comprising a polarizer after the second geometric phase grating, the polarizer configured to transmit light in the second polarization state and block light in the first polarization state.

10. The device of claim 1, further comprising a depolarizer configured to depolarize the incident light beam before the incident light beam reaches the geometric phase grating.

11. The device of claim 1, further comprising a collimator configured to collimate the first light beam and the second light beam after the first light beam and the second light beam pass through the angular selective waveplate, wherein the collimator comprises a refractive lens, a Fresnel lens, or a geometric phase lens.

12. The device of claim 11, further comprising a quarter-wave plate configured to covert circularly polarized light into linearly polarized light.

13. A polarization converter comprising:
a first geometric phase grating configured to diffract an incident light beam into a first light beam and a second light beam, wherein:
the first light beam is characterized by a first circular polarization state and a first propagation direction; and
the second light beam is characterized by a second circular polarization state and a second propagation direction; and
an angular selective waveplate configured to:
receive the first light beam and the second light beam from the first geometric phase grating;
maintain the first circular polarization state of the first light beam incident in the first propagation direction; and
change a polarization state of the second light beam incident in the second propagation direction from the second circular polarization state to the first circular polarization state.

14. The polarization converter of claim 13, wherein the first geometric phase grating includes a Pancharatnam-Berry phase (PBP) grating is characterized by a birefringence of a half wavelength of the incident light beam.

15. The polarization converter of claim 13, wherein the angular selective waveplate includes:
a homogeneous oblique plate including liquid crystal molecules tilted uniformly at an oblique angle; or
a splayed plate including liquid crystal molecules aligned at different respective angles in different layers.

16. The polarization converter of claim 13, further comprising a circular polarizer configured to transmit light in the first circular polarization state and block light in the second circular polarization state.

17. The polarization converter of claim 13, further comprising a second geometric phase grating configured to change polarization states of the first light beam and the second light beam after the first light beam and the second light beam pass through the angular selective waveplate.

18. The polarization converter of claim 17, wherein the second geometric phase grating includes a geometric phase lens configured to collimate the first light beam and the second light beam after the first light beam and the second light beam pass through the angular selective waveplate.

19. The polarization converter of claim 17, further comprising:
a circular polarizer configured to transmit light in the second circular polarization state and block light in the first circular polarization state;
a quarter-wave plate configured to covert circularly polarized light into linearly polarized light; or
both.

20. The polarization converter of claim 13, further comprising a depolarizer configured to depolarize the incident light beam before the incident light beam reaches the first geometric phase grating.

* * * * *